(12) United States Patent
Robinson et al.

(10) Patent No.: US 9,251,621 B2
(45) Date of Patent: Feb. 2, 2016

(54) POINT REPOSITION DEPTH MAPPING

(75) Inventors: Michael G. Robinson, Boulder, CO (US); Charles J. Ozinga, Denver, CO (US)

(73) Assignee: RealD Inc., Beverly Hills, CA (US)

( * ) Notice: Subject to any disclaimer, the term of this patent is extended or adjusted under 35 U.S.C. 154(b) by 538 days.

(21) Appl. No.: 12/729,061

(22) Filed: Mar. 22, 2010

(65) Prior Publication Data

US 2011/0074770 A1 Mar. 31, 2011

Related U.S. Application Data

(63) Continuation-in-part of application No. 12/573,852, filed on Oct. 5, 2009, now Pat. No. 8,400,496, and a continuation-in-part of application No. 12/541,902, filed on Aug. 14, 2009, now Pat. No. 8,300,089.

(60) Provisional application No. 61/162,280, filed on Mar. 21, 2009, provisional application No. 61/102,493, filed on Oct. 3, 2008, provisional application No. 61/089,018, filed on Aug. 14, 2008.

(51) Int. Cl.
*G06T 15/00* (2011.01)
*G06T 15/20* (2011.01)

(52) U.S. Cl.
CPC ..................... *G06T 15/20* (2013.01)

(58) Field of Classification Search
CPC ........... H04N 13/0022; H04N 13/0239; G06T 7/0075; G06F 2207/10
USPC ................................................. 345/419–420
See application file for complete search history.

(56) References Cited

U.S. PATENT DOCUMENTS

| 4,028,934 | A | | 6/1977 | Sollish |
| 4,557,570 | A | | 12/1985 | Hines |
| 5,065,236 | A | | 11/1991 | Diner |
| 5,175,616 | A | | 12/1992 | Milgram et al. |
| 5,548,362 | A | | 8/1996 | Wah Lo et al. |
| 5,664,163 | A | | 9/1997 | Yutaka et al. |
| 5,801,760 | A | | 9/1998 | Uomor |
| 6,043,838 | A | | 3/2000 | Chen |
| 6,175,379 | B1 | * | 1/2001 | Uomori et al. ............ 348/47 |
| 6,324,347 | B1 | | 11/2001 | Bacs, Jr. et al. |
| 6,326,995 | B1 | | 12/2001 | Palm et al. |
| 6,512,892 | B1 | | 1/2003 | Montgomery et al. |

(Continued)

FOREIGN PATENT DOCUMENTS

GB 2351216 A 12/2000

OTHER PUBLICATIONS

Supplementary European Search Report from co-pending European application No. 10756671 dated Jul. 3, 2012.

(Continued)

*Primary Examiner* — Weiming He
(74) *Attorney, Agent, or Firm* — Darlene K. Kondo; Neil G. J. Mothew

(57) ABSTRACT

A method and apparatus for providing optimal correction to depth mapping between captured and displayed stereoscopic content. The solution is derived in a continuous form that can be implemented through CGI scaling techniques compatible with image rendering techniques. Similar correction can be implemented with variable depth-dependent camera separation and disparity re-mapping. The latter is applicable to correcting existing stereoscopic content.

14 Claims, 15 Drawing Sheets

(56) References Cited

U.S. PATENT DOCUMENTS

| | | | |
|---|---|---|---|
| 6,798,406 | B1 | 9/2004 | Jones et al. |
| 6,831,677 | B2 | 12/2004 | Peleg et al. |
| 6,963,661 | B1 | 11/2005 | Hattori et al. |
| 7,557,824 | B2 | 7/2009 | Holliman |
| 7,938,540 | B2 | 5/2011 | Brentnall et al. |
| 8,085,293 | B2 | 12/2011 | Brodsky et al. |
| 2002/0118275 | A1 | 8/2002 | Harman |
| 2003/0164841 | A1 | 9/2003 | Myers |
| 2004/0136571 | A1 | 7/2004 | Hewitson et al. |
| 2004/0207641 | A1 | 10/2004 | Palm et al. |
| 2005/0089212 | A1 | 4/2005 | Mashitani et al. |
| 2005/0117215 | A1 | 6/2005 | Lange |
| 2005/0190180 | A1 | 9/2005 | Jin et al. |
| 2006/0039529 | A1 | 2/2006 | Tsubaki et al. |
| 2006/0152579 | A1 | 7/2006 | Utsugi et al. |
| 2006/0203085 | A1 | 9/2006 | Tomita |
| 2007/0075997 | A1* | 4/2007 | Rohaly et al. ................. 345/419 |
| 2007/0247522 | A1 | 10/2007 | Holliman |
| 2008/0226160 | A1 | 9/2008 | Birtwistle et al. |
| 2009/0207236 | A1 | 8/2009 | Feda |
| 2009/0268014 | A1* | 10/2009 | Holliman ........................ 348/46 |
| 2009/0295790 | A1* | 12/2009 | Pockett ........................ 345/419 |
| 2013/0141550 | A1 | 6/2013 | Pockett |

OTHER PUBLICATIONS

Lipton, "Stereographics: Developers' Handbook", Stereographics Developers Handbook, XX, XX, pp. 42-49, XP002239311 (Jan. 1, 1997).

European patent search report for patent application No. 09807398 dated Dec. 16, 2011.

International search report and written opinion in corresponding PCT application No. PCT/US2010/028182.

Wheatstone, C., "On Some Remarkable, and Hitherto Unobserved Phenomena of Binocular Vision (Part the First)", Phil. Trans. Roy. Soc. Lon. pp. 371-394 (1838).

Lipton, L., "Foundations of the Stereoscopic Cinema", Van Nostrand Reinhold (1982).

Engle, R., "Beowulf 3D: A Case Study," Proc. of SPIE-IS&T Electronic Imaging, SPIE vol. 6083, 68030R.

Berretty, R-P. M. et al., "Real Time Rendering for Multiview Autostereoscopic Displays," Proc. of SPIE and IS&T Electronic Imaging, SPIE vol. 6055, 6055N (2006).

International Search Report and Written Opinion in corresponding PCT application No. PCT/US10/028182.

International Search Report and Written Opinion for corresponding PCT application No. PCT/US09/059596.

International Search Report and Written Opinion for corresponding PCT application No. PCT/US09/053954.

Notification of Transmittal of International Preliminary Report on Patentability, International Preliminary Report on Patentability from PCT/US09/53954 mailed May 1, 2012.

Supplementary Partial European Patent search report patent application No. 09818628 dated May 15, 2012.

Williams, et al, "New computational control techniques and increased understanding for stereo 3-D displays", Proceedings of SPEI, vol. 1256, pp. 73-82, XP000565512, ISSN: 0277-0786X (Jan. 1, 1990).

International preliminary report on patentability from PCT/US10/28182 mailed Sep. 27, 2011.

Supplemental European search report in EP Application No. 09807398.4 dated Sep. 11, 2012.

\* cited by examiner

POINT REPOSITION DEPTH MAPPING

CROSS-REFERENCE TO RELATED APPLICATIONS

This application is (1) a continuation-in-part application and claims priority to U.S. patent application Ser. No. 12/573,852, filed Oct. 5, 2009 entitled "Optimal depth mapping," which is a non-provisional application of U.S. Provisional Patent Application No. 61/102,493, filed Oct. 3, 2008 entitled "Optimal Depth Mapping," and a continuation-in-part application of U.S. patent application Ser. No. 12/541,902, filed Aug. 14, 2009 entitled "Stereoscopic depth mapping" (hereinafter "Stereoscopic depth mapping application"), which is a non-provisional application of U.S. Provisional Patent Application No. 61/089,018, filed Oct. 14, 2008 entitled "Linear stereoscopic depth mapping" and (2) a non-provisional application and claims priority to U.S. Provisional Patent Application No. 61/162,280, filed Mar. 21, 2009 entitled "Point reposition depth mapping", all of which are commonly-assigned and incorporated herein by reference for all purposes. Pursuant to 37 CFR 1.7 (b), this application is hereby filed on Monday, Mar. 22, 2010, which is the next succeeding business day following the one year anniversary of the filing of Prov. Pat. App. No. 61/162,280.

TECHNICAL FIELD

This disclosure generally relates to stereoscopic image processing and, more specifically, to modification of perceived stereoscopic depth by computer graphical (CG) modification of point repositioned models.

BACKGROUND

Stereoscopic capture and viewing has been commonplace since Charles Wheatstone invented the Stereoscope in 1833 as discussed in *On Some Remarkable, and Hitherto Unobserved Phenomena of Binocular Vision (Part the First)*, Wheatstone, Charles, Phil. Trans. Roy. Soc. Lon. pp. 371-394 (1838). Similar to the present day ViewMaster®, this Victorian device uses two still camera images which are seen independently by a viewer's eyes. The spatial separation or disparity between similar objects within the images gives the sensation of depth.

Capture of stereoscopic content is achieved with two cameras whose fixed spacing is chosen to match a depth budget associated with a playback display device. This generally results in perceived depth being both compressed and distorted producing 'cardboard cut-outs' and flat 'wall-paper' backgrounds.

BRIEF SUMMARY

Methods and apparatuses disclosed in the present application include substantially correcting the distorted depth mapping of stereoscopic capture and display systems.

According to an aspect, a method is provided for generating an optimal stereoscopic image. The method includes an optimizing sequence comprising determining an original position of a point in a scene having an original depth, modifying the original position of the point in the scene to a new position having a new depth. According to an aspect, the modifying the original position of the point in the scene to a new position includes using a depth scaling function, $Z'(Z)$, wherein Z represents the original position of the point in the scene. According to another aspect, the modifying the original position of the point in the scene to a new position further comprises moving the original position of the point in the scene along a line extending through the original position of the point in the scene and a midpoint between two capture camera positions. According to another aspect, the optimizing sequence is repeated for every point in the scene.

According to another aspect, another method for generating an optimal stereoscopic image is provided. The method includes determining a preserved perspective of a scene and scaling the preserved perspective of the scene.

According to yet another aspect, a method for generating a computer generated imagery scene using optimal depth mapping is provided. An exemplary method may include real time rendering of CG images.

Other features and aspects will be apparent with reference to the detailed description, the drawings, and the claims.

DETAILED DESCRIPTION

When two cameras of fixed separation capture a stereoscopic image pair from a real scene, the depth on a playback stereo display is non-linear. Uniformly-spaced objects (such as telegraph poles disappearing into the distance) appear to get closer together the further away they are. As used herein, the term "camera" refers to either a physical camera or a capture viewpoint in Computer Generated Imagery (CGI) virtual space. The present disclosure may relate to both a real-world capture environment and a CGI environment.

Figure 1A:
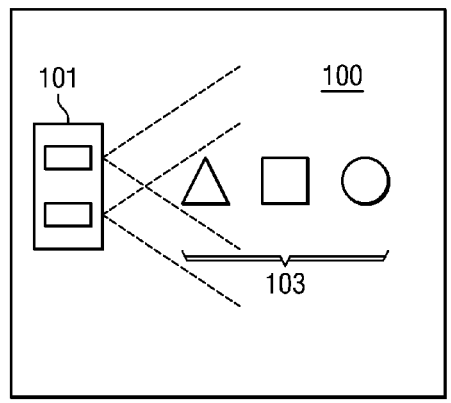
FIGS. 1A and 1B are schematic diagrams illustrating a top view of a scene and a top view of objects as visualized on a display illustrating non-linear depth mapping, in accordance with the present disclosure.
Figure 1B:
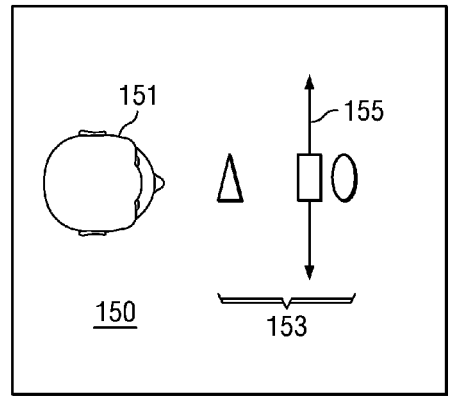

FIGS. 1A and 1B are schematic diagrams illustrating this depth distortion phenomenon. FIG. 1A illustrates the top view of a scene 100 with stereoscopic cameras 101 and substantially equally-spaced objects 103. FIG. 1B illustrates the top of the same scene 150 as visualized on a display. Viewer 151 faces a display with a display plane 155, and perceives the objects 153 at a non-uniform depth.

Figure 2:
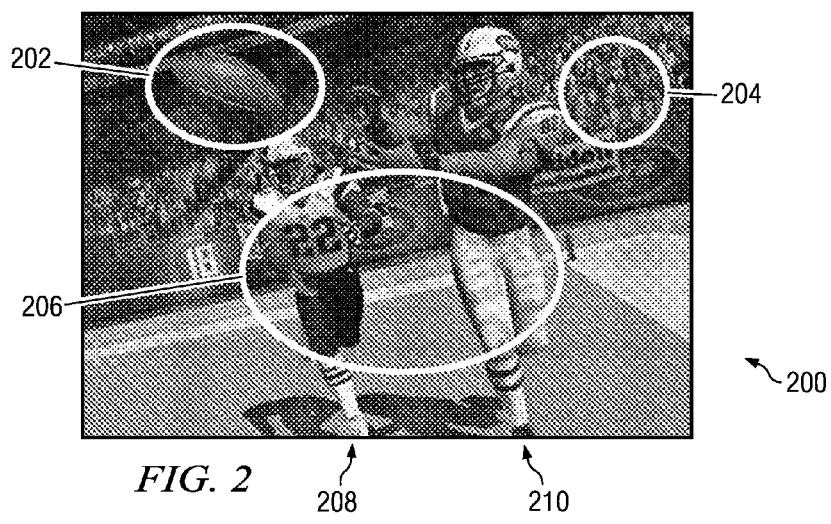
FIG. 2 is a schematic diagram illustrating the effect of non-linear depth mapping on a 3D image, in accordance with the present disclosure.

FIG. 2 is a schematic diagram illustrating a 3-D scene 200 and the effect of non-linear depth mapping. The ball 202 is in the foreground of the scene 200 and appears too close (and thus, appears distorted). The depth between the players 208 and 210, who appear in the middle ground of the scene 200, is relatively good. The crowd 204 in the background appears flat and appears similar to a painted backdrop or wallpaper.

The geometries of the camera capture and display playback systems and the relation between actual and perceived depth have been analyzed by many individuals, see, e.g., Lipton, Lenny, *Foundations of the Stereoscopic Cinema*, Van Nostrand Reinhold (1982), which is herein incorporated by reference for all purposes. Mathematical analysis reveals a general difficulty to provide scaled-depth on finite sized displays as large disparities on physically small screens typically cause viewer discomfort. Scaled-depth is defined herein as when perceived depth is directly proportional to actual depth, causing objects to appear at the appropriate depth for their position and size. Others have proposed correcting for this distorted depth by introducing variable camera separation for discrete depth regions within the scene, see, e.g., U.S. Pat. No. 7,557,824 to Holliman, which is herein incorporated by reference for all purposes. This approach is applicable within the context of computer graphical (CG) generation of content and is routinely used in Hollywood content generation for scene enhancement, as discussed by Rob Engle in *Beowulf 3D: A Case Study*, Proc. of SPIE-IS&T Electronic Imaging, SPIE Vol. 6083, 68030R, which is herein incorporated by reference for all purposes. To date, these approaches typically use artistic decisions to determine where perceived depth should be emphasized. In the Stereoscopic depth mapping application, an algorithm is disclosed for determining depth allocation automatically, making it highly suitable for automated environments such as those employed in computer games. The present disclosure also provides a method for determining depth allocation. Thus, a mathematical analysis of the relationship between the capture and replay display geometries is provided below.

Mathematical Framework

Figure 3:
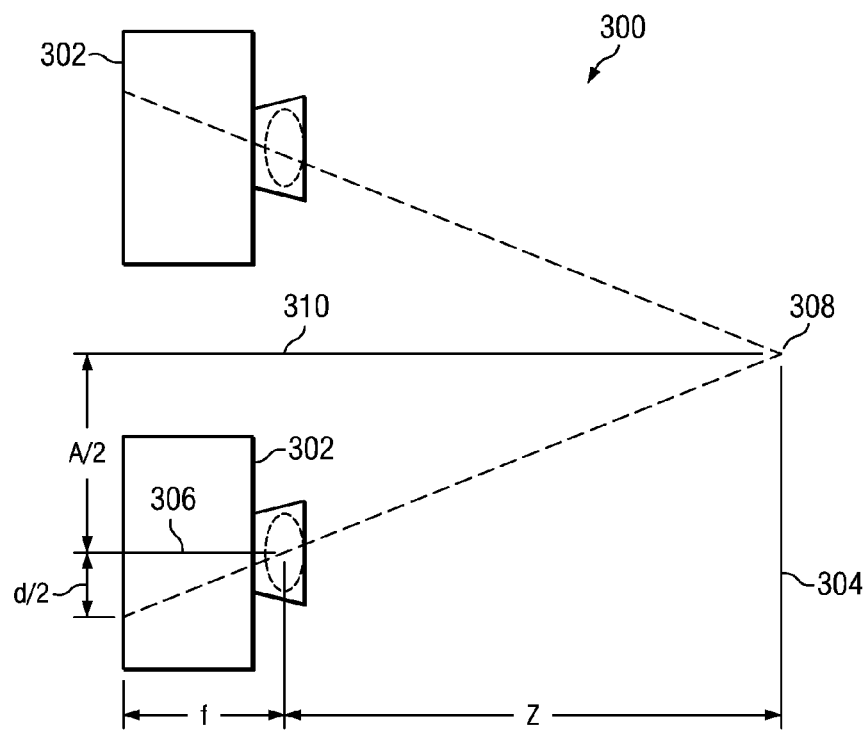
FIG. 3 is a schematic diagram illustrating stereo capture geometry, in accordance with the present disclosure.

FIG. 3 shows a top-down view of a symmetrical capture set-up 300 with parallel cameras 302, i.e. cameras with parallel optical axes symmetrical around a line 310 running through the object 308 and perpendicular to the object plane 304. Line 306 runs along the optical axis of camera 302 and through a central sensor (or the central portion of the sensor) of camera 302 (and is perpendicular to the object plane 304). A symmetrical capture set-up 300 is used to avoid vertical disparity from keystone distortion that is present with non-parallel optical axes. The distance Z from the cameras 302 to the plane of the object 304 is related to d/2 and A/2 by:

$$\frac{d}{f} = \frac{A}{Z} \qquad \text{(Equation 1)}$$

where f is the focal length of camera 302, d/2 is the distance from line 306 (or the distance from the central sensor), and A/2 is the distance from line 310 to line 306.

Figure 4:
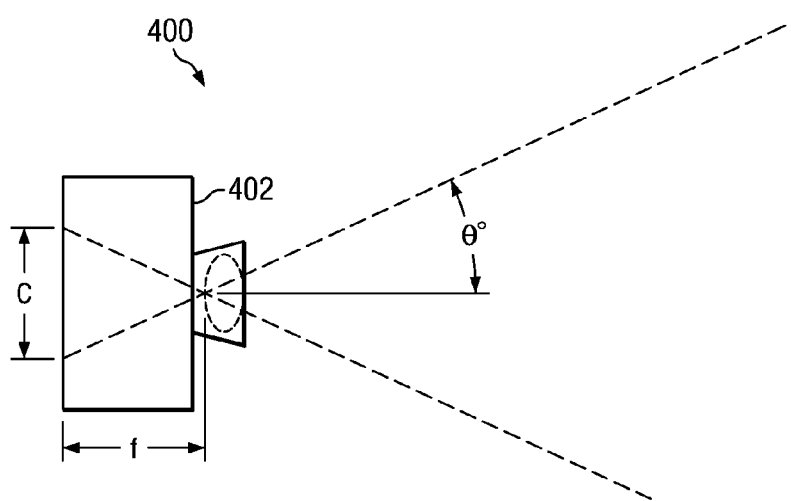
FIG. 4 is a schematic diagram illustrating camera parameters, in accordance with the present disclosure.

FIG. 4 is a schematic diagram of a top-down view 400 of a camera 402. The focal length f of the camera 402 is further related to the half-angle capture $\theta$ of the camera 402 and its sensor size c by the geometry of FIG. 4, where:

$$c = 2f \tan \theta \qquad \text{(Equation 2).}$$

Figure 5:
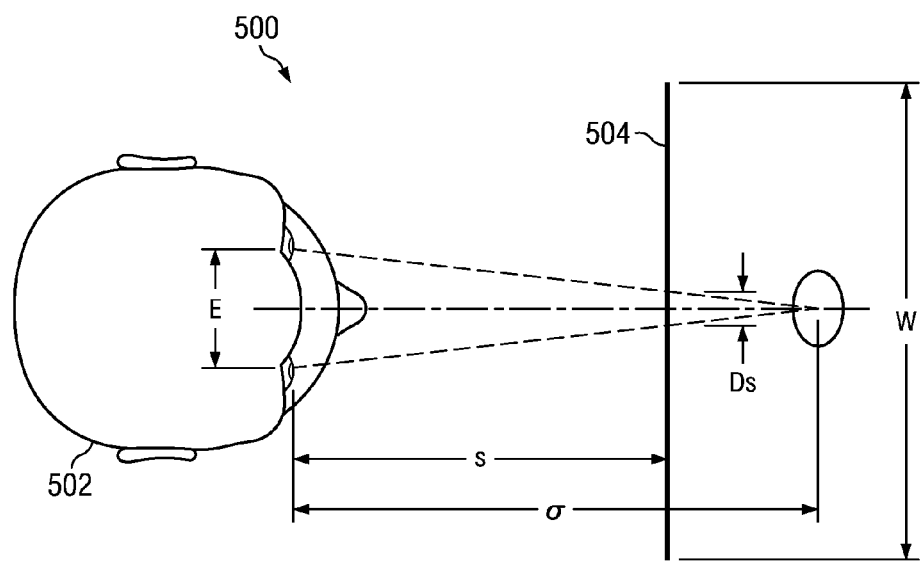
FIG. 5 is a schematic diagram illustrating the viewing geometry of disparity on the screen to perceived depth, in accordance with the present disclosure.

FIG. 5 is a schematic diagram of a top-down view of replay geometry 500. A viewer 502 with eye separation E looks at a screen 504 onto which the stereoscopic imagery captured in FIG. 3 is replayed. The distance of the screen s, the eye separation E, and the screen disparity Ds, determine the perceived depth $\sigma$, through the relation:

$$\sigma = \frac{E \cdot s}{(E - Ds)}. \qquad \text{(Equation 3)}$$

The disparity Ds of any one point on the screen from an object originally captured at a distance Z is related to the scaled camera sensor disparity d and a fixed disparity (or offset) D as follows:

$$Ds = D - \frac{W}{c} d. \qquad \text{(Equation 4)}$$

D is the fixed disparity or offset between a left and right image pairs in units of the screen. An image pair may be shifted by a fixed disparity D after capture. Alternatively, the camera sensors may be moved relative to the lenses. D is introduced to set the zero parallax or screen depth position by shifting and cropping of the captured images.

Combining Equations 1-4 yields the following expression relating perceived depth σ with actual depth Z:

$$\sigma = \frac{s \cdot E \cdot Z}{\left(E \cdot Z - D \cdot Z + \frac{A \cdot Z}{2\tan\theta}\right)}. \quad \text{(Equation 5)}$$

This is the general form of the mapping equation relating actual depth Z to perceived depth σ for a given capture-replay system.

Suitable values for A and D are those that fit the mapped depth within the limits or disparity budget of the display. All displays have a disparity budget where image separation does not exceed a maximum $Ds_{max}$ or a minimum amount $Ds_{min}$.

Figure 6:
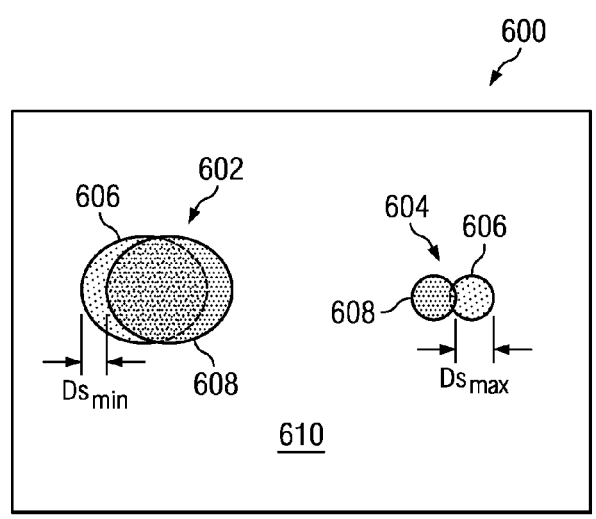
FIG. 6 is a schematic diagram illustrating the disparity limits for a display screen, in accordance with the present disclosure.

FIG. 6 is a schematic diagram illustrating a disparity budget for a 3D image scene 600 displayed on a display screen 610. The left eye 608 and right eye 606 views for the nearest object 602 and the farthest object 604 are shown in the scene 600. The nearest object 602 defines the minimal image separation $Ds_{min}$ between the left eye 608 and the right eye 606 for the scene 600. The farthest object 604 defines the maximum image separation $Ds_{max}$ between the left eye 608 and the right eye 606 for the scene 600. The disparity budget depends on screen size, position of objects on the screen (e.g., central positioning is more forgiving than side positioning), and the personal characteristics of the viewer (some people can endure more than others). However, applying maximum and minimum conservative limits to any given display should ensure a good stereoscopic viewing experience.

Once a disparity budget is determined, a fixed camera separation A and fixed disparity D can be determined mathematically. Using Equations 1-4, the following expressions are derived for the minimum ($Ds_{min}$) and maximum ($Ds_{max}$) on-screen disparities, which correspond to the greatest separation of near and far objects respectively:

$$Ds_{min} = D - \frac{W \cdot A}{2Z_{min}\tan\theta} \text{ and} \quad \text{(Equation 6)}$$

$$Ds_{max} = D - \frac{W \cdot A}{2Z_{max}\tan\theta}. \quad \text{(Equation 7)}$$

Subtracting these two expressions and solving for the camera separation A yields the following expression for a preferred fixed separation camera set up to accommodate a desired disparity budget:

$$A = \frac{2 \cdot \tan\theta \cdot Z_{max} \cdot Z_{min} \cdot (Ds_{max} - Ds_{min})}{W \cdot (Z_{max} - Z_{min})} \quad \text{(Equation 8)}$$

which when substituted into Equation 5, yields the following expression for the fixed disparity setting:

$$D = \frac{(Z_{max} \cdot Ds_{max} - Z_{min} \cdot Ds_{min})}{(Z_{max} - Z_{min})}. \quad \text{(Equation 9)}$$

Scaled Mapping

This disclosure provides further information relating to the Stereoscopic depth mapping application and provides solutions to the non-linear depth representation in stereoscopic displays. This disclosure provides an optimal solution in the form of a scaling expression which may, for example, be used with real-time game rendering techniques.

As discussed above, the Stereoscopic depth mapping application describes the non-linear relation between the perceived depth σ and the actual depth Z of objects captured with a stereo camera pair (camera separation Ac, half angle capture θ) when viewed at a distance s from a W wide stereoscopic display system. The expression is:

$$\sigma(Z) = \frac{s \cdot E \cdot Z}{\left(E \cdot Z - D \cdot Z + \frac{Ac \cdot W}{2 \cdot \tan\theta}\right)} \quad \text{(Equation 10)}$$

where E is the inter-ocular separation (e.g., 65 mm) and D is the fixed disparity of the captured images provided either by offsetting the camera lenses during capture, or image shifting and cropping after the fact. The magnitudes of the camera separation Ac and the fixed disparity D are given by:

$$Ac = \frac{2 \cdot (D\_max - D\_min) \cdot \tan(\theta) \cdot Z\_max \cdot Z\_min}{W \cdot (Z\_max - Z\_min)} \text{ and} \quad \text{(Equation 11)}$$

$$D = D\_max + \frac{W \cdot Ac}{2 \cdot Z\_max \cdot \tan(\theta)} \quad \text{(Equation 12)}$$

$$D = D\_min + \frac{W \cdot Ac}{2 \cdot Z\_min \cdot \tan(\theta)}.$$

In the Stereoscopic depth mapping application, an analytic solution for a variable separation correction resulting in a linear depth mapping was derived where:

$$\sigma = \alpha + \beta \cdot Z \quad \text{(Equation 13)}.$$

The Stereoscopic depth mapping application also provides solutions that were between Equation 13 and the default mapping with a choice of exact mapping. Justification for this was the competition between the derived linear and the desired 'scaled mapping' direct proportionality condition: σ∝Z (Equation 14).

Optimal Mapping

In the present disclosure, it is proposed that the optimum mapping substantially ensures a constant factor between the desired depth mapping, or gradient at any position (σ/Z), and the actual mapping $$\left(\frac{d\sigma}{dZ}\right).$$

In other words, the perceived depth at any part in the scene is a constant factor of the desired, scaled depth. Furthermore, it recognizes the equivalence of camera separation to scene scaling, providing a mapping within the latter framework, thus making it more compatible with CG image rendering. Ultimately it provides a depth-dependent scaling formula.

Figure 7:
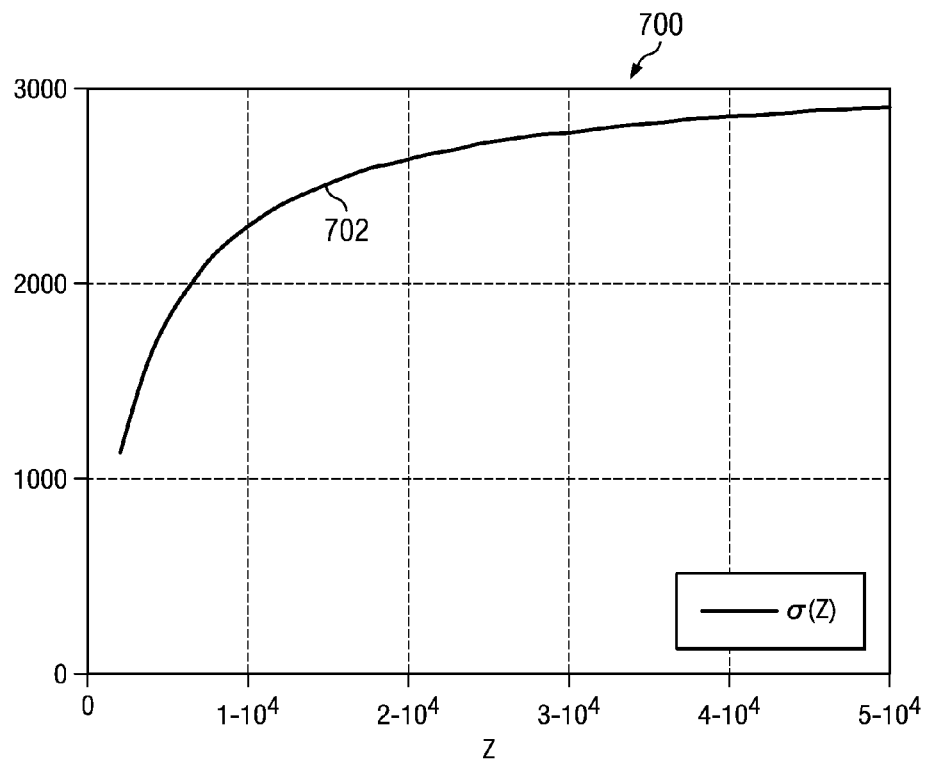
FIG. 7 is a graph illustrating typical non-linear mapping between perceived depth and actual depth in a stereoscopic replay display system, in accordance with the present disclosure.

FIG. 7 is a graph 700 illustrating the typically non-linear depth mapping relationship 702 between σ and Z described by Equation 10. The capture and replay parameters used in exemplary case (and in later examples) are given in the following table (Table 1):

TABLE 1

Capture and Replay Parameters.

| Parameter | Value | Description |
| --- | --- | --- |
| Z_min | 2,000 mm | Closest object in the captured scene |
| Z_max | 50,000 mm | Furthest object in the captured scene |
| D_min | −50 mm | Maximum screen disparity (Crossed eyes) |
| D_max | 20 mm | Maximum disparity (Parallel eyes) |
| W | 1,000 mm | Screen width |
| s | 2,000 mm | Viewing distance |
| θ | 15° | Camera half angle capture |

Using Equations 11 and 12, the capture camera separation A and the fixed disparity D are calculated to be ~78 mm and ~23 mm respectively.

However, at any depth Z, a preferred gradient of the curve in FIG. 7 is $$\frac{\sigma(Z)}{Z}$$

in accordance with the "scaled" condition of Equation 14.

Figure 8:
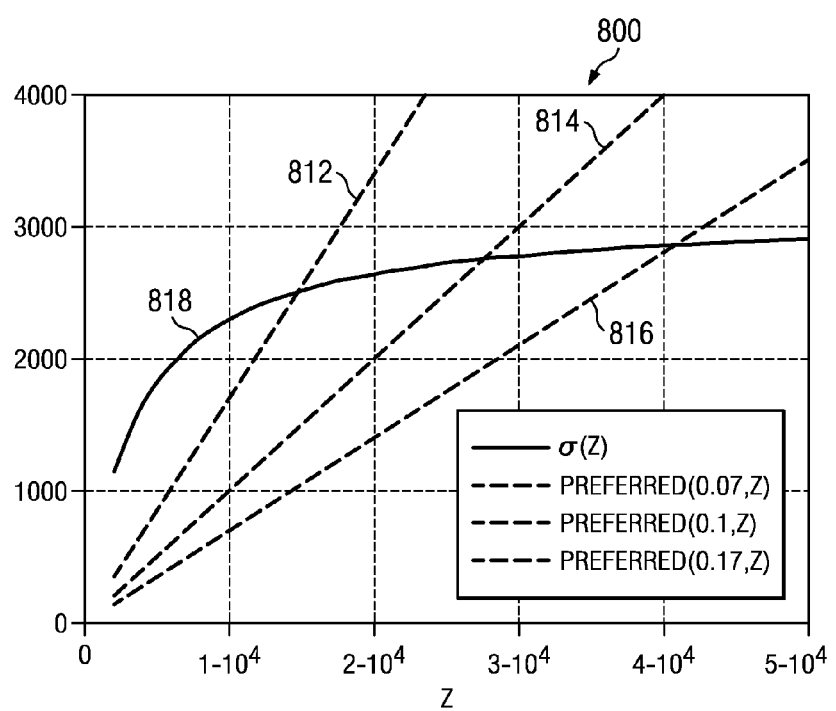
FIG. 8 is a graph illustrating a mapping of direct proportionality and a depth-mapping curve, in accordance with the present disclosure.

FIG. 8 is a graph 800 illustrating the differences between these preferred gradients 812, 814, and 816, or localized depth mapping, and that which is achieved by simple stereoscopic capture and display 818. Angles between the intersecting lines 812, 814, 816 represent an error, which is difficult to reduce to zero. Thus, as discussed in the Stereoscopic depth mapping application, direct proportionality may be achieved only in certain circumstances.

In an embodiment of the present disclosure, an optimum condition that can be achieved with typical capture and playback parameters is provided. This optimum condition may be defined as being when the local depth representation (or mapping gradient) is in direct proportion to the desired gradient irrespective of scene position. Visually, this means the perceived scene is scaled uniformly in depth throughout. Mathematically, this may be described as:

$$\frac{d}{dZ}\sigma(Z) = \alpha \cdot \frac{\sigma(Z)}{Z} \quad \text{(Equation 15)}$$

where σ'(Z) is a modified mapping function, and α is a proportionality constant to be determined.

To obtain an optimal mapping, it is possible to vary the spacing A of the capture cameras as a function of depth (A(Z) as discussed in the Stereoscopic depth mapping application), but one embodiment also formulates a solution in terms of depth-dependent scaling (DDS).

DDS is an approach that maps each point in the 3D scene located at (X, Y, Z), with a reference point being the center of the two stereoscopic camera lenses, onto a new point (X', Y', Z'), where:

$$\begin{pmatrix} X' \\ Y' \\ Z' \end{pmatrix} = \frac{1}{Z} \cdot \begin{pmatrix} Z'(Z) & 0 & 0 \\ 0 & Z'(Z) & 0 \\ 0 & 0 & Z'(Z) \end{pmatrix} \cdot \begin{pmatrix} X \\ Y \\ Z \end{pmatrix}. \quad \text{(Equation 16)}$$

Since the projection of a scene onto a camera sensor remains substantially unchanged when scaled in this manner from the camera lens position, DDS simply affects depth for stereoscopic camera capture. Mathematically, the scaling approach and the camera separation approach are equivalent with a simple relationship:

$$\frac{A(Z)}{Ac} = \frac{Z}{Z'(Z)}. \quad \text{(Equation 17)}$$

To minimize scaling, the scene limits are fixed at Z_max and Z_min and remain substantially the same after scaling. With this desirable restriction, it is possible to get an optimal analytic mapping function as follows.

A scaling function Z'(Z) may be used that solves Equation 15 under fixed scene limit conditions. This may be described mathematically as:

$$\frac{d}{dZ}\sigma(Z) = \frac{d}{dZ}\sigma(Z') = \alpha \cdot \frac{\sigma(Z)}{Z} \quad \text{where:} \quad \text{(Equation 18)}$$

$$Z'(Z\_min) = Z\_min \text{ and } Z'(Z\_max) = Z\_max. \quad \text{(Equation 19)}$$

Equation 10 may then be re-written as:

$$\sigma(Z) = \frac{A \cdot Z}{Z + B} \quad \text{(Equation 20)}$$

$$\text{with } A = \frac{s \cdot E}{(E-D)} \text{ and } B = \frac{W \cdot Ac}{2 \cdot (E-D) \cdot \tan(\theta)} \quad \text{(Equation 21)}$$

Using Equation 20, Equation 18 may be rewritten as:

$$\frac{d}{dZ}\sigma(Z) = \left(\frac{d}{dZ'}\sigma(Z')\right) \cdot \frac{d}{dZ}Z'(Z) = \frac{A \cdot \alpha}{Z + B}. \quad \text{(Equation 22)}$$

And since this is separable both sides can be integrated:

$$\int \left(\frac{d}{dZ'}\sigma(Z')\right) dZ' = \int \frac{A \cdot \alpha}{Z + B} dZ \quad \text{(Equation 23)}$$

which yields:

$$\frac{A \cdot Z'}{Z' + B} = A \cdot \alpha \cdot \ln(Z + B) + \beta \quad \text{(Equation 24)}$$

or:

$$Z'(Z) = \frac{(A \cdot \alpha \cdot \ln(Z + B) + \beta) \cdot B}{A - A \cdot \alpha \cdot \ln(Z + B) - \beta}. \quad \text{(Equation 25)}$$

Next, using the conditions of Equation 21, α and β can be solved for:

$$\alpha = \frac{B \cdot (Z\_min - Z\_max)}{\ln\left[\frac{(Z\_min + B)}{(Z\_max + B)}\right] \cdot [(Z\_min + B) \cdot (Z\_max + B)]} \quad \text{and} \quad \text{(Equation 26)}$$

$$\beta = \frac{A \cdot Z\_min}{Z\_min + B} - A \cdot \alpha \cdot \ln(Z\_min + B).$$

Equations 25 and 26 then provide an embodiment of the scaling used for optimal depth representation.

Figure 9:
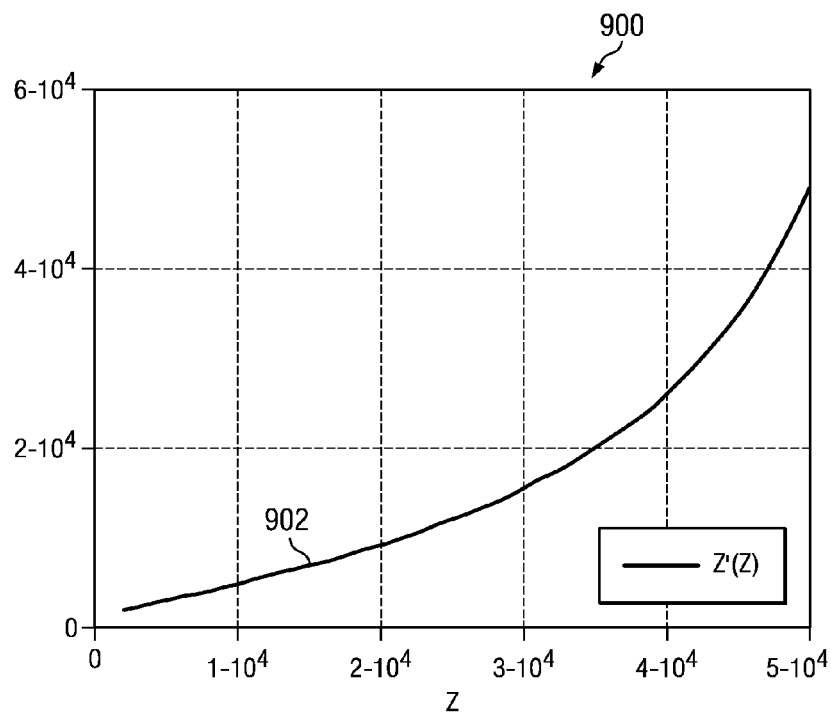
FIG. 9 is a graph illustrating a scaled scene mapping for optimal depth reconstruction, in accordance with the present disclosure.

FIG. 9 is a graph 900 representing the scene mapping relationship Z'(Z) 902 derived for the parameters of Table 1.

Figure 10:
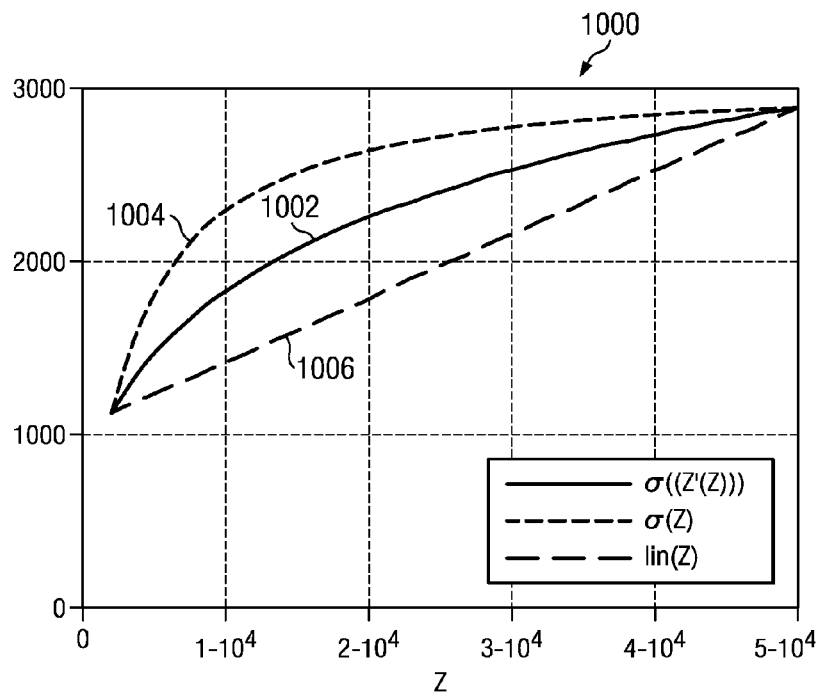
FIG. 10 is a graph illustrating optimal depth mapping relative to conventional depth mapping and linear mapping, in accordance with the present disclosure.
Figure 11A:
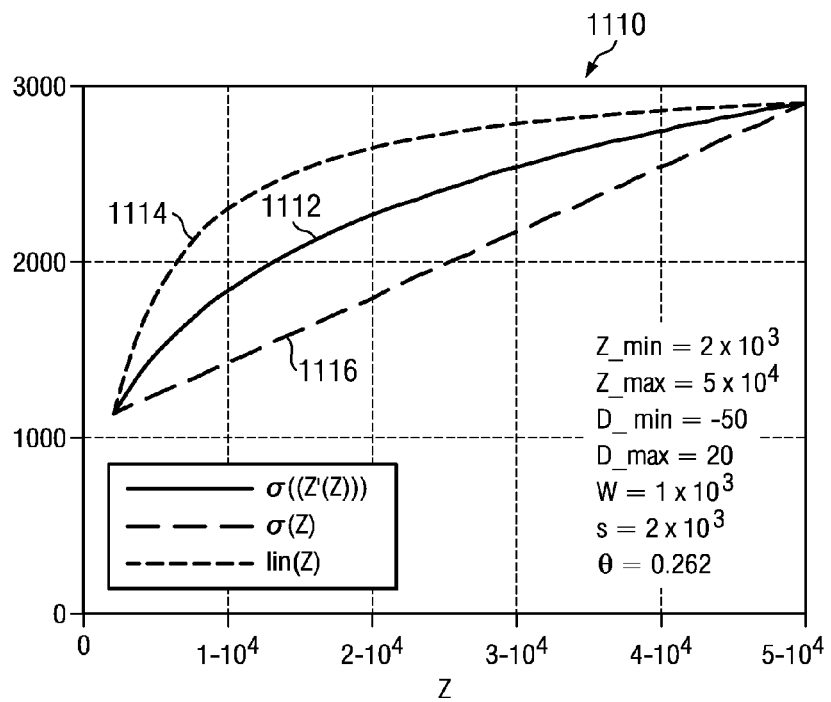
FIG. 11 is a graph illustrating optimal mapping solutions for various capture/replay parameters, in accordance with the present disclosure.
Figure 11B:
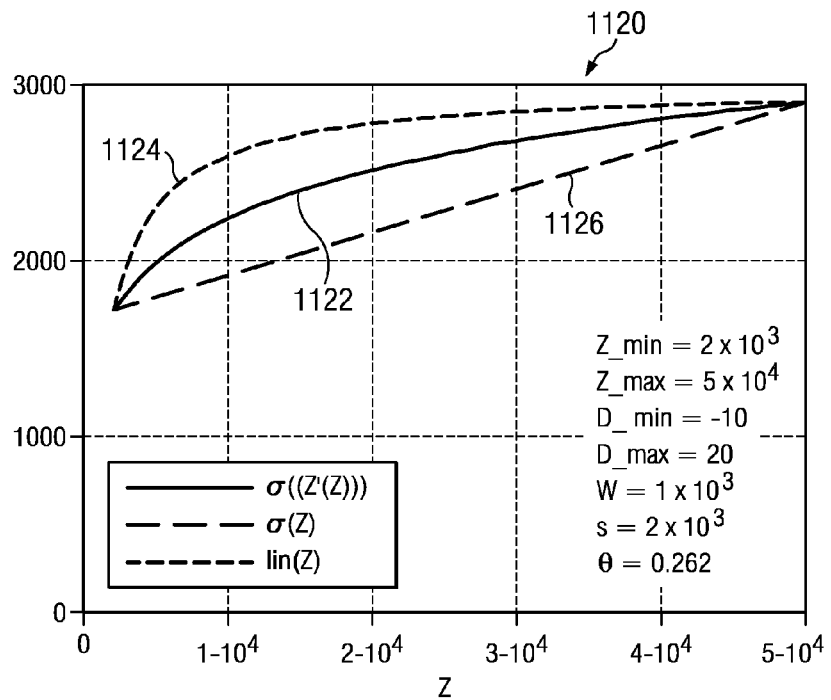
Figure 11C:
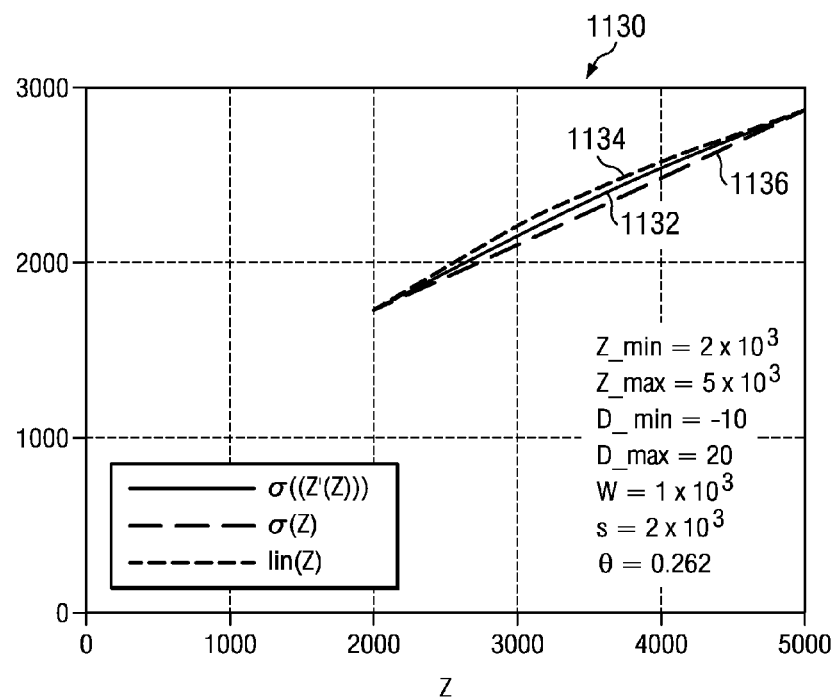
Figure 11D:
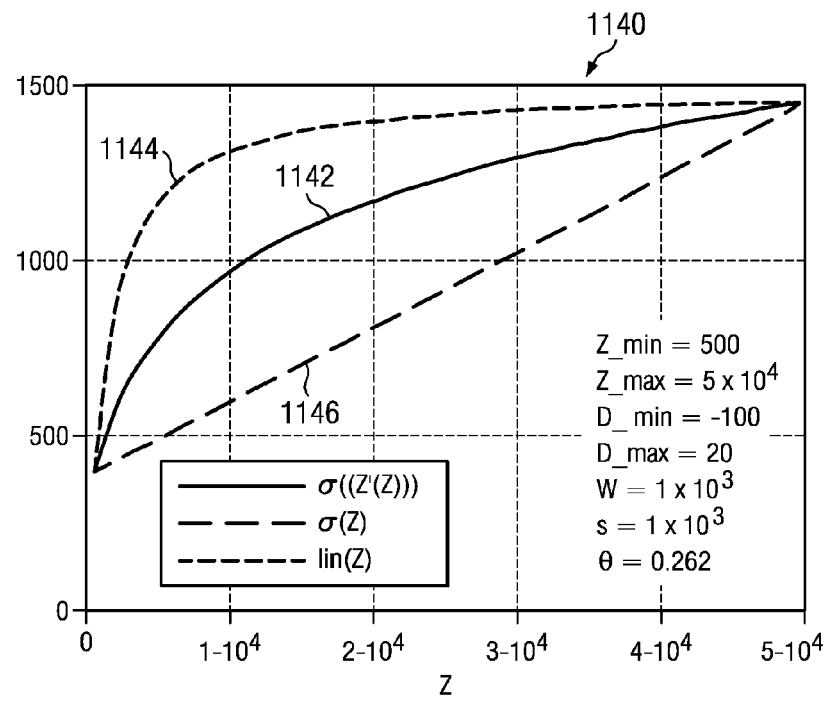

FIG. 10 is a graph 1000 illustrating an optimal depth mapping solution 1002 when scene mapping relationship 902 (from FIG. 9) is combined with Equation 20. Optimal depth mapping 1002 (or σ((Z'(Z))) is shown relative to uncorrected or conventional depth mapping 1004 (or σ(Z)) and linear or "scaled mapping" 1006 (or lin(Z)). The optimal depth mapping solution 1002 shows a close relationship to the scaled mapping solution 1006 of the Stereoscopic depth mapping application as expected since practical implementation suggests that scaled mapping 1006 is closely correlated with an optimal depth mapping solution 1002.

FIGS. 11A to 11D are graphs 1110, 1120, 1130, 1140 illustrating triplet curve sets similar to the graph of FIG. 10. The curve sets of FIGS. 11A-11D illustrate mapping solutions for various Capture/Replay scenarios which show the general trend whereby optimal solutions 1112, 1122, 1132, 1142 lie between uncorrected solutions 1114, 1124, 1134, 1144 and scaled mapping solutions 1116, 1126, 1136, 1146.

Figure 12:
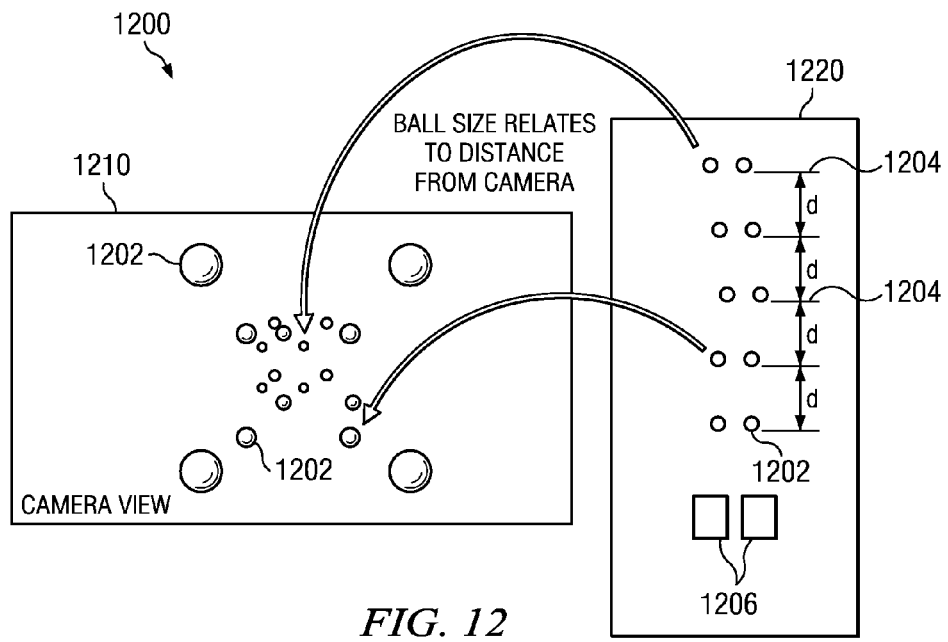
FIG. 12 is a schematic diagram illustrating an exemplary capture scene, in accordance with the present disclosure.

FIG. 12 is a schematic diagram illustrating an exemplary stereoscopic capture scene 1200 including a top scene view 1220 and a camera view 1210. A series of balls 1202 in five uniformly spaced depth planes 1204 are captured by stereo cameras 1206. In the camera view 1210, the ball size relates to the distance from the camera 1206.

Figure 13:
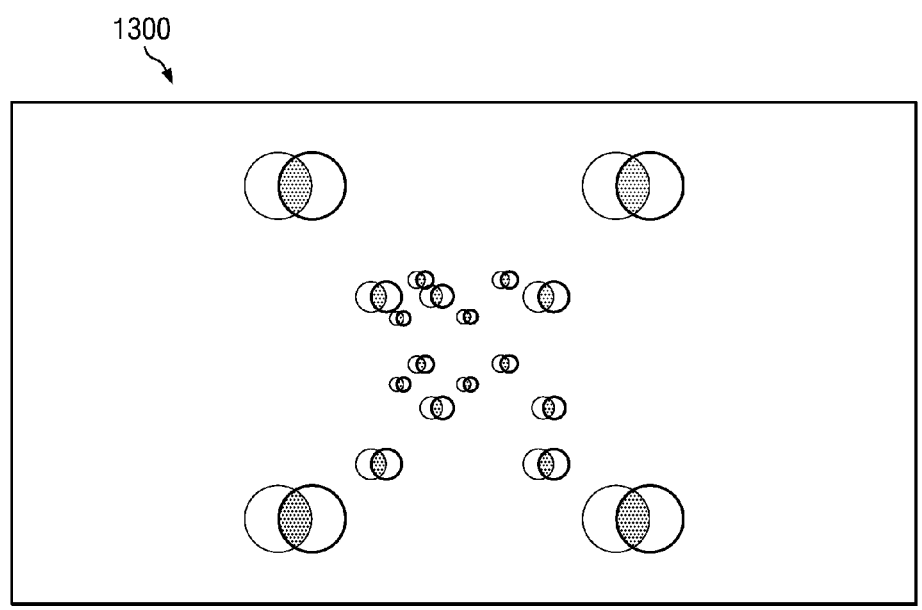
FIG. 13 is a schematic diagram illustrating an uncorrected anaglyph stereoscopic image, in accordance with the present disclosure.

FIG. 13 is a schematic diagram illustrating an uncorrected stereoscopic image 1300. In this embodiment, for viewing purposes, stereoscopic image 1300 is rendered in anaglyph so that depth can be sensed using classic red cyan glasses.

Figure 14:
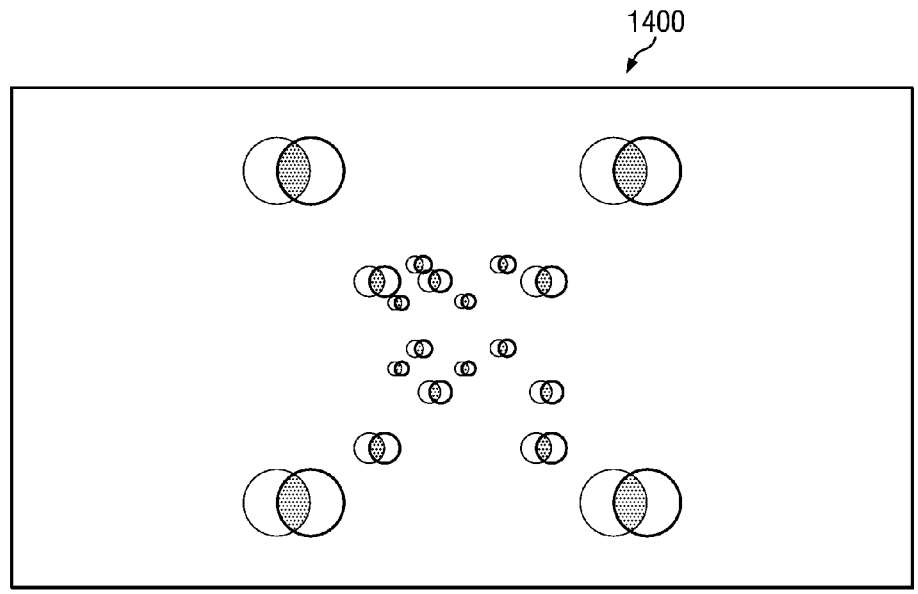
FIG. 14 is a schematic diagram illustrating an optimally corrected anaglyph image, in accordance with the present disclosure.

FIG. 14 is a schematic diagram illustrating an optimal depth mapping stereoscopic image 1400. In this embodiment, for viewing purposes, stereoscopic image 1400 is rendered in anaglyph so that depth can be sensed using classic red cyan glasses. By comparison, the images 1300 and 1400 illustrate how the optimal depth mapping substantially avoids the flattening of the back images relative to those closer to the viewer without causing any substantial distortions.

Figure 15:
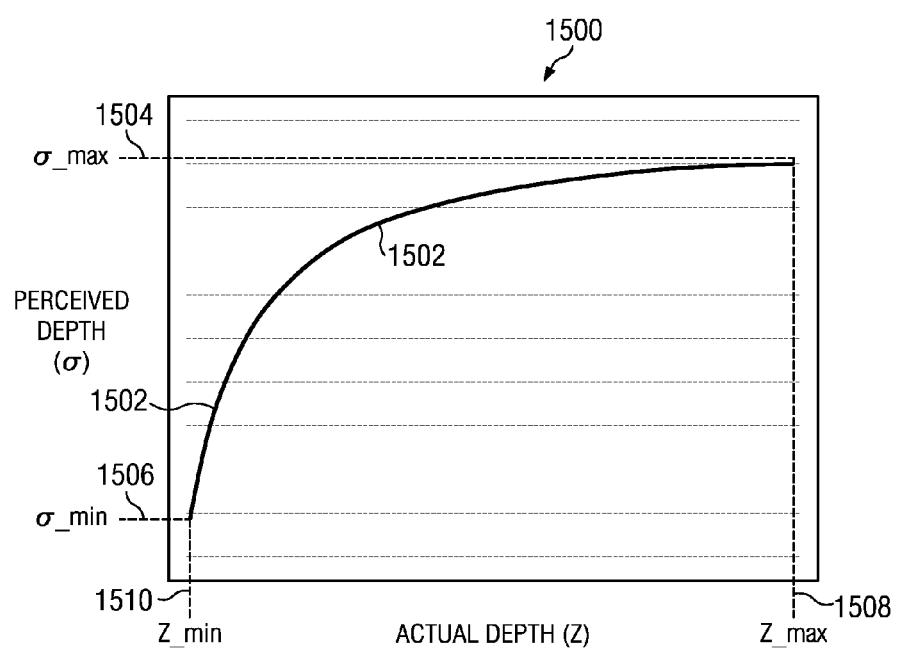
FIG. 15 is a graph illustrating a typical non-linear mapping between perceived depth and actual depth in a stereoscopic replay display system, in accordance with the present disclosure.

FIG. 15 is another graph 1500 also illustrating the non-linear mapping relationship 1502 between actual depth Z and perceived depth σ for stereoscopic images. As discussed above, the restraining of scene depths to within limits based on display sizes (for D≠E) results in a non-linear relation between perceived and actual depth described by Equation 27. Such perceived depth limits are shown by boundary lines for maximum perceived depth σ_max 1504 and minimum perceived depth σ_min 1506. Actual depth boundary limits are shown by maximum depth Z_max 1508 line and minimum depth Z_min 1510 line. The local perceived depth is directly related to the gradient of this curve since a small object at depth Z of actual thickness t has a perceived thickness τ of:

$$\tau = t \cdot \left( \frac{d}{dZ} \sigma(Z) \right). \quad \text{(Equation 27)}$$

Accordingly, the steeper gradient of line 1502 for close objects implies a greater depth is experienced relative to those objects further away. As discussed above, for very far objects, the perceived depth is often flat, explaining mathematically the phenomenon of painted backdrops often seen in stereoscopic replay imagery. Of the limited depth budget, most is allocated to the foreground. Depth budget reallocation (DBR) describes altering the perceived/actual depth curve to provide more uniform local depth throughout the scene.

Figure 16:
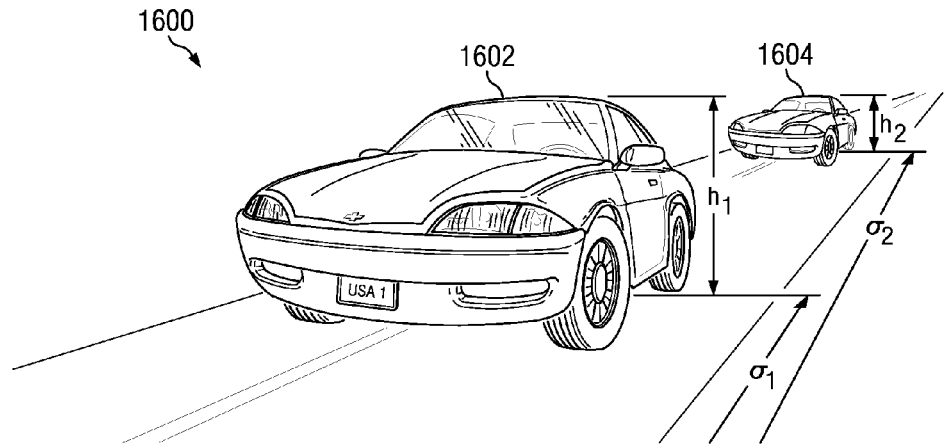
FIG. 16 is a schematic diagram illustrating a scene with depth, in accordance with the present disclosure.

FIG. 16 is a schematic perspective drawing 1600 illustrating perceived depth of two objects and the display heights of those two objects respective to one another. A desired perceived depth mapping is one that accurately preserves perspective, defining a substantially fixed relation between perceived depth and displayed object heights. An example image is shown in drawing 1600 of two similar cars 1602 and 1604 captured at different perceived depths ($\sigma_1$ and $\sigma_2$) from a viewing position. For these images to appear 'correct' (i.e. as if you were actually viewing two cars 1602, 1604), the relative heights ($h_1$ and $h_2$) and perceived depths ($\sigma_1$ and $\sigma_2$) should be directly proportional according to the following equation:

$$\frac{\sigma_1}{h_1} = \frac{\sigma_2}{h_2}. \quad \text{(Equation 28)}$$

In accordance with the above Equation 28, perceived depth is directly proportional to actual depth.

Figure 17:
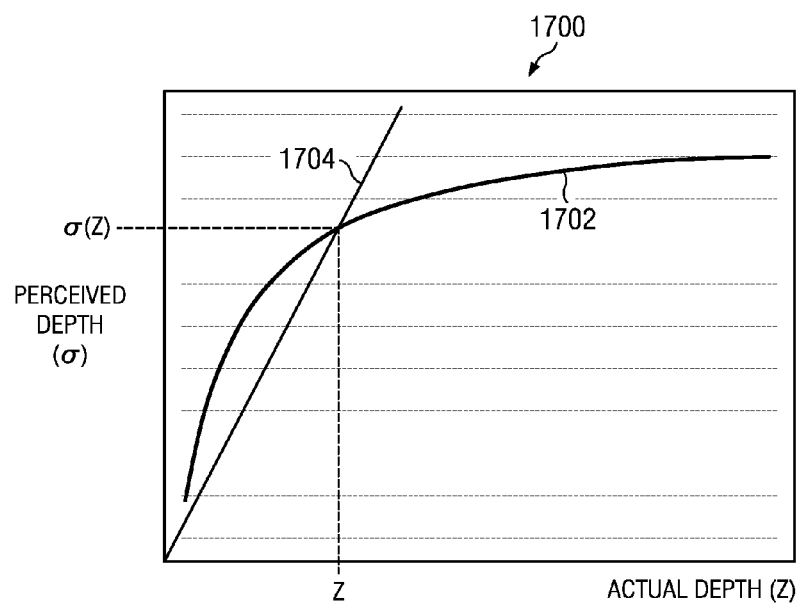
FIG. 17 is a graph illustrating the non-linear mapping relationship and a desired relationship between actual depth and perceived depth, in accordance with the present disclosure.

FIG. 17 is a graph 1700 illustrating a line 1702 showing the non-linear mapping relationship between actual depth Z and perceived depth σ for stereoscopic images and a line 1704 showing a desired relationship between perceived and actual depth. This desired direct proportional relationship is represented by a straight line 1704 passing through the origin on the perceived vs. actual depth graph 1700. Generally, smaller displays such as LCD monitors have smaller disparity limits than large screens or movie screens, therefore it is difficult to provide such a desired mapping between perceived depth and actual depth for some perspective views on such smaller displays. While it is possible to attempt preservation of this directly proportional relationship, display of such on smaller displays may lead to viewer fatigue and headaches.

As discussed above, to address this problem and to make the stereoscopic view more natural, the present disclosure provides for an altering of the relation between the perceived and actual depth through a depth scaling function Z'(Z). Below, another embodiment of a depth scaling function Z'(Z) is discussed.

Depth Scaling Function

The depth scaling function Z'(Z) can be understood as a modified depth for each point or vertex, initially positioned at Z, making up all the objects in a scene. To retain an object's captured size, each point may be reassigned a depth value Z' and may also be scaled by the ratio of new to old depth toward the camera. Mathematically, the depth values for points at (x, y, z) co-ordinates in a three-dimensional space may be transformed to reassigned depth values at points (x', y', z') in accordance with the following equation:

$$\begin{pmatrix} x' \\ y' \\ Z' \end{pmatrix} = \frac{Z'(Z)}{Z} \cdot \begin{pmatrix} x \\ y \\ z \end{pmatrix} \quad \text{(Equation 29)}$$

where the system coordinates' origin is the point midway between the camera lenses.

Figure 18A:
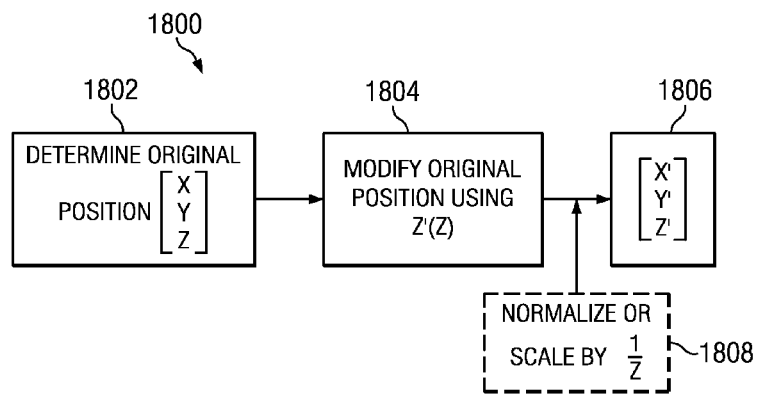
FIGS. 18A and 18B are schematic diagrams illustrating a process and a module for implementing optimal depth correction, in accordance with the present disclosure.
Figure 18B:
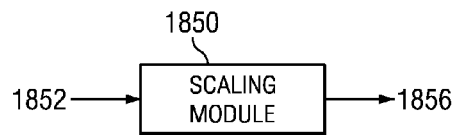

FIGS. 18A and 18B are schematic diagrams illustrating an embodiment of a process 1800 and a module 1850 for implementing an optimal depth mapping algorithm. In the process 1800, the original position of a point $$\begin{bmatrix} x \\ y \\ z \end{bmatrix}$$

(discussed above as an initial position Z) is determined in step 1802. The original position of the point is modified by some scaling solution Z'(Z) in step 1804. The original position may be normalized or scaled by 1/Z in step 1808 and a new position $$\begin{bmatrix} x' \\ y' \\ z' \end{bmatrix}$$

is determined at step

In an embodiment, the process 1800 is implemented in a scaling module 1850 operable to receive and analyze scene and display information 1852 and provide modified scene information 1856. The module 1850 may be any suitable logical device known in the art, and may be embodied in hardware, software, or a combination. The module 1850 may also be stored on a computer readable medium, as instructions for a machine. Determining the scaling solution Z'(Z) to render the new position $$\begin{bmatrix} x' \\ y' \\ z' \end{bmatrix}$$

an optimal depth mapping solution is discussed below.

Local Depth

The local perceived thickness τ of a small object of thickness h is given by Equation 30:

$$\tau = h \cdot \left(\frac{d}{dZ}\sigma(Z)\right). \qquad \text{(Equation 30)}$$

From Equation 30, a local perceived depth Δ may be defined as being the ratio of the real to perceived thickness, according to Equation 31 below:

$$\Delta = \frac{d}{dZ}\sigma(Z). \qquad \text{(Equation 31)}$$

A captured scene, modified through a scaling operation, has a modified local depth, Δ', where:

$$\Delta'(Z) = \frac{d}{dZ}\sigma(Z'(Z)). \qquad \text{(Equation 32)}$$

Desired Depth

One-to-one replay would mean the local depth is equal to 1 throughout the scene, and, thus, perceived depth limits (determined by the screen disparity limits) will lie on a line 1704 in FIG. 17 where σ=Z. In general, this becomes difficult, as it creates extreme disparity for the viewer. To address the extreme disparity for the viewer, a desired local depth may be used as a fixed proportion of the perspective preserving ("scaled mapping" as discussed in the Stereoscopic depth mapping application), direct proportional gradient Γ according to Equation 33:

$$\Gamma = \frac{\sigma(Z)}{Z} \qquad \text{(Equation 33)}$$

or in the case where the scene is scaled by Z:

$$\Gamma = \frac{\sigma(Z'(Z))}{Z}. \qquad \text{(Equation 34)}$$

Mathematically, a scaling solution, Z'(Z), is preferred, where for any position Z within the scene where the following relation holds:

$$\frac{d}{dZ}\sigma(Z'(Z)) = \gamma \cdot \frac{\sigma(Z'(Z))}{Z} \qquad \text{(Equation 35)}$$

with γ a constant independent of Z. This can be solved analytically.

First Embodiment of a Scaling Solution Z'(Z)

Equation 35 can be expressed as:

$$\left(\frac{d}{dZ}\sigma(Z')\right) \cdot \frac{d}{dZ}Z' = \gamma \cdot \frac{\sigma(Z')}{Z}. \qquad \text{(Equation 36)}$$

From Equation 36, Equation 37 may be derived:

$$\sigma(Z') = \frac{\alpha}{1+\frac{\beta}{Z'}} \qquad \text{(Equation 37)}$$

where: $\alpha = \frac{E \cdot s}{(E-D)}$ and $\beta = \frac{W \cdot A \cdot f}{(E-D) \cdot c}$.

Substituting this expression into Equation 36 gives:

$$\frac{\beta \cdot dZ'}{Z' \cdot (Z'+\beta)} = \frac{\gamma \cdot dZ}{Z} \qquad \text{(Equation 38)}$$

which, when integrated, gives:

$$\ln(Z') - \ln(Z'+\beta) = \gamma \cdot \ln(Z) + \infty \qquad \text{(Equation 39)}$$

where γ is a constant of integration.

Equation 39 can be solved to yield an embodiment of a solution for a scaling solution:

$$Z'(Z) = \frac{\beta}{(K \cdot Z^{-\gamma} - 1)} \qquad \text{(Equation 40)}$$

where K is a constant related to γ.

To complete the solution, the constants γ and K are determined by applying the disparity limit conditions:

$$Z_{max} = \frac{\beta}{(K \cdot Z_{max}^{-\gamma} - 1)} \text{ and } Z_{min} = \frac{\beta}{(K \cdot Z_{min}^{-\gamma} - 1)}. \quad \text{(Equation 41)}$$

Solving these for γ and K and back substituting for β (Equation 37) and then for A and B (Equations 8 and 9), the following scaling solution that delivers the desired optimal depth mapping profile is derived:

$$Z'(Z) = \frac{\beta}{(K \cdot Z^{-\gamma} - 1)} \quad \text{(Equation 42)}$$

where:

$$\beta = \frac{(D_{max} - D_{min}) \cdot (Z_{min} \cdot Z_{max})}{[E \cdot (Z_{max} - Z_{min}) - D_{max} \cdot Z_{max} + D_{min} \cdot Z_{min}]}$$

$$\gamma = \frac{\ln\left[\frac{(E - D_{max})}{E - D_{min}}\right]}{\ln\left(\frac{Z_{min}}{Z_{max}}\right)} \text{ and } K = \frac{(Z_{min} + \beta)}{Z_{min}^{1-\gamma}}.$$

Second Embodiment of a Scaling Solution Z'(Z)

In another embodiment, an alternative scaling solution or point reposition depth mapping function Z'(Z) may be used. This alternative embodiment point reposition depth mapping function is defined as follows:

$$Z'(Z) = \frac{(\alpha \cdot \ln(Z + \beta) + B) \cdot \beta}{1 - \alpha \cdot \ln(Z + \beta) - B},$$

where $\beta = \frac{(D_{max} - D_{min}) \cdot (Z_{min} \cdot Z_{max})}{[E \cdot (Z_{max} - Z_{min}) - D_{max} \cdot Z_{max} + D_{min} \cdot Z_{min}]},$ where $\alpha = \frac{\beta \cdot (Z_{min} - Z_{max})}{\ln\left[\frac{(Z_{min} + \beta)}{Z_{max} + \beta}\right] \cdot [(Z_{min} + \beta) \cdot (Z_{max} + \beta)]},$ where $B = \frac{Z_{min}}{Z_{min} + \beta} - \alpha \cdot \ln(Z_{min} + \beta),$ where Z is an initial model point location from a left-eye or a right-eye observation point, where $$Z = \begin{pmatrix} x \\ y \\ z \end{pmatrix},$$

and where E is eye separation. (Equation 43).

This mapping may be a desirable choice in cases where automated correction of depth is desired, such as in computer gaming scenarios or for automated CGI stereoscopic rendering.

In yet another embodiment, the point reposition depth mapping function may be implemented using a look up table, where predetermined values for Z'(Z) are located in the table based upon input parameters. Such a look up table may be populated with predetermined values calculated using the foregoing examples of point reposition depth mapping functions.

Implementation

In an embodiment, use of optimal mapping within a gaming environment (for example) wherein stereoscopic images are rendered on the fly as a function of player position and view direction is provided. In conventional 2D games, it is routine to render a single image based on the viewer position on a frame by frame basis. Extension to stereo is a simple matter of rendering two views for different camera positions. Fortunately, current commercially available stereo TVs display half resolution images for left and right eye views making stereo rendering demands no greater than that of conventional 2D HD. These demands however are still such that rasterization techniques are used rather than ray tracing.

During rasterization, vertices of polygons that make up the 3D world model are first transformed using matrices that scale, translate, rotate etc. before being projected onto the 2D view plane and shaded in accordance with their depth (i.e. their Zbuffer values). In an embodiment, a transformation of model polygons in accordance with the non-linear scaling transformation (Equation 16) during real-time rendering of a stereoscopic game, thus optimizing the 3D experience, is proposed. To achieve this, it is preferable to apply the capture and replay parameters. Fortunately, many are fixed in any single game session. Those that commonly vary include the scene depth limits $Z_{max}$ and $Z_{min}$.

One technique for obtaining these parameters is to use the depth information from a previous rendered Zbuffer; whereas another is to calculate them directly from the polygon vertices data before transformation. Object depth information might also be used to alter the disparity limits dependent on its position within the view. Near objects close to or even intersecting the vertical edges of the display might be used to reduce the disparity limits, hence, avoiding undesirable depth cue conflicts. Large changes in parameters should be avoided in the game authoring, but if sudden modest jumps occur in the capture parameters then alteration of the mapping transformation should be damped avoiding large jumps in depth.

Figure 19:
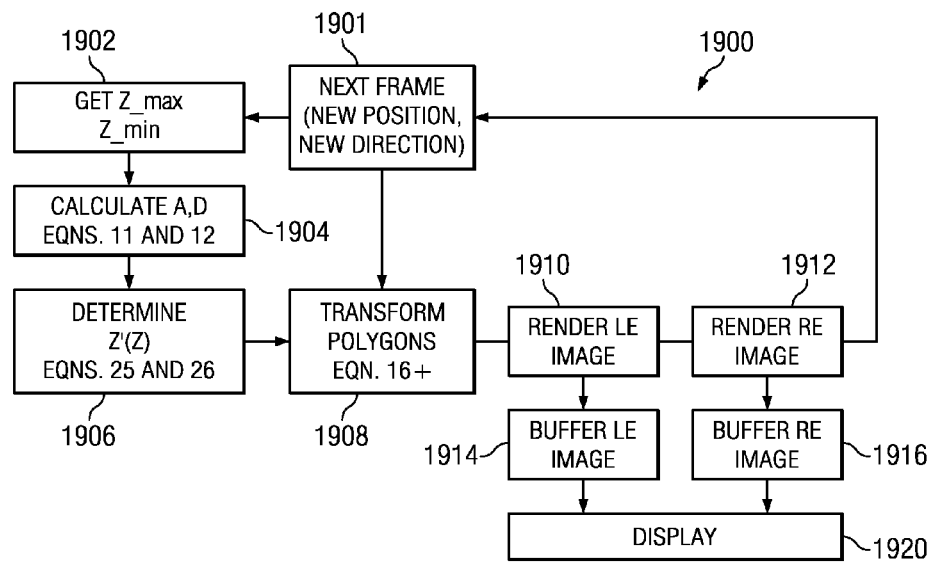
FIG. 19 is a flow diagram for real-time optimal depth correction, in accordance with the present disclosure.

FIG. 19 is a flow diagram 1900 showing an exemplary process for real-time optimal depth correction. In step 1901, a frame's position and direction are determined (this includes determining the coordinates of a particular vertex of a polygon of the frame). Next, in step 1902, Z_max and Z_min for that position and direction are determined. From that, A and D can be calculated using equations 11 and 12 in step 1904. The scaling function or scaling solution Z'(Z) can then be determined using equations 25 and 26 in step 1906. Using equation 16, the vertices of polygons are transformed in step 1908 using the original information from step 1901 and the scaling function Z'(Z) determined in 1906. Next, the left and right images are rendered in steps 1910 and 1912 and then buffered in steps 1914 and 1916 before being displayed in step 1920. Then the process may start over again in step 1901, where the next frame's position and direction (and the coordinates of a polygon) are determined. As discussed above, in an embodiment, the depth information from a previous rendered Zbuffer may be used for determining the position and direction in step 1901. In another embodiment, depth information may be calculated directly from the polygon vertices data before transformation in determining the position and direction in step 1901.

Another embodiment may use the optimal mapping scaling method on non-real time applications and one that would employ alternative rendering algorithms such as ray tracing. Once again, the 3D model would undergo non-linear scaling in accordance with the formulation, and stereoscopic images would be rendered accordingly.

Other embodiments could remap depth in pre-captured images according to disparity. Assuming the capture replay parameters are known, the disparity Ds between left- and right-eye images relates to perceived depth according to:

$$\sigma = \frac{s \cdot E}{E - Ds} \quad \text{(Equation 44)}$$

Manipulation of this expression and replacing the uncorrected perceived depth ($\sigma$) with the desired optimal one ($\sigma'$) yields the following expression for corrected disparity Ds':

$$Ds' = E - E \cdot \frac{s}{\sigma(Z'(Z))}. \quad \text{(Equation 45)}$$

Back substitution gives the following relation between old and new disparity.

$$Ds' = E - E \cdot \frac{s}{\sigma\left[Z'\left[-B \cdot E \cdot \frac{s}{(E \cdot s + A \cdot Ds - A \cdot E)}\right]\right]}. \quad \text{(Equation 46)}$$

This expression allows the disparity Ds of any pixel within conventionally captured stereoscopic images to be given a new value Ds'. In practice, this means shifting pixel values and smearing or in-painting where gaps are left.

Figure 20:
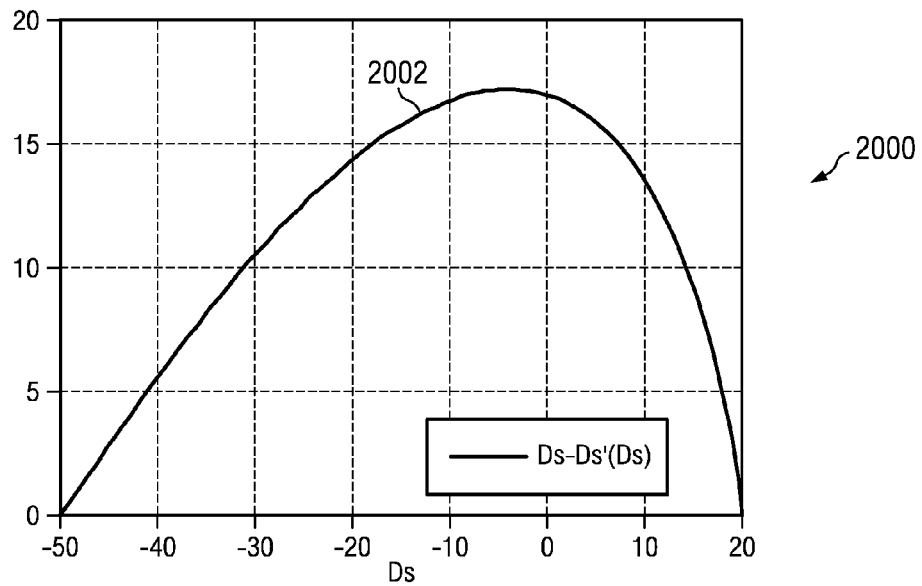
FIG. 20 is a graph illustrating disparity correction for optimal depth mapping, in accordance with the present disclosure.

FIG. 20 is a graph 2000 illustrating pixel shift as a function of measured disparity Ds–Ds' (Ds) 2002 for the capture/replay parameters of Table 1. Implementation of this embodiment may use disparity estimation using established or other techniques, shifting pixels according to Equation 44, and then filling in voids using either established or future in-painting techniques.

CG Rendering

In an embodiment, the implementation of this reallocation approach is well-suited to a CG environment where 3D models exist together in a 3D world and from which a camera is able to create 2D images of a given scene.

Image creation is termed rendering and, in its raw form, is a mathematical manipulation of the graphical information. As discussed above, 3D models generally have points or vertices between which textures are painted. Each vertex has a coordinate (X, Y, Z) within a Cartesian world system described by basis vectors i, j, and k. Each vertex also typically has a color or a texture associated with it to allow the polygons (defined by the lines joining the vertices) to be correctly shaded.

A camera is situated within the world at a position ($C_x$, $C_y$, $C_z$) with frustum orientation vectors I, J, K, where I and J are oriented along the horizontal and vertical aspects of the final image, and K is the direction at which the camera is pointed. The aspect of the camera is a, where a≈0.56 for standard HD format, and finally it has a zoom setting $\zeta$ defined here as the ratio c/2f.

In general, a vertex may be shifted along a line extending from itself to the position of a capturing camera without affecting its 2D image location. To modify disparity for depth correction, an additional shift may be used with a component along a direction parallel to the offset of the cameras. In this manner, numerous manipulations may yield the same corrected depth capture, which includes z-scaling.

General depth modifying point repositioning can be defined by:

$$\begin{pmatrix} x' \\ y' \\ z' \end{pmatrix} = k \cdot \begin{pmatrix} x \\ y \\ z \end{pmatrix} + \begin{pmatrix} \Delta x \\ 0 \\ 0 \end{pmatrix}. \quad \text{(Equation 47)}$$

where the coordinates have been chosen (quite generally) with the camera (left or right) located at (0; 0; 0), having an optic axis along (0; 0; 1), and separated from its partner along an axis parallel to (1; 0; 0). $\Delta x$ directly affects the disparity of the repositioned point, the extent of which is determined by the value of k.

Figure 23:
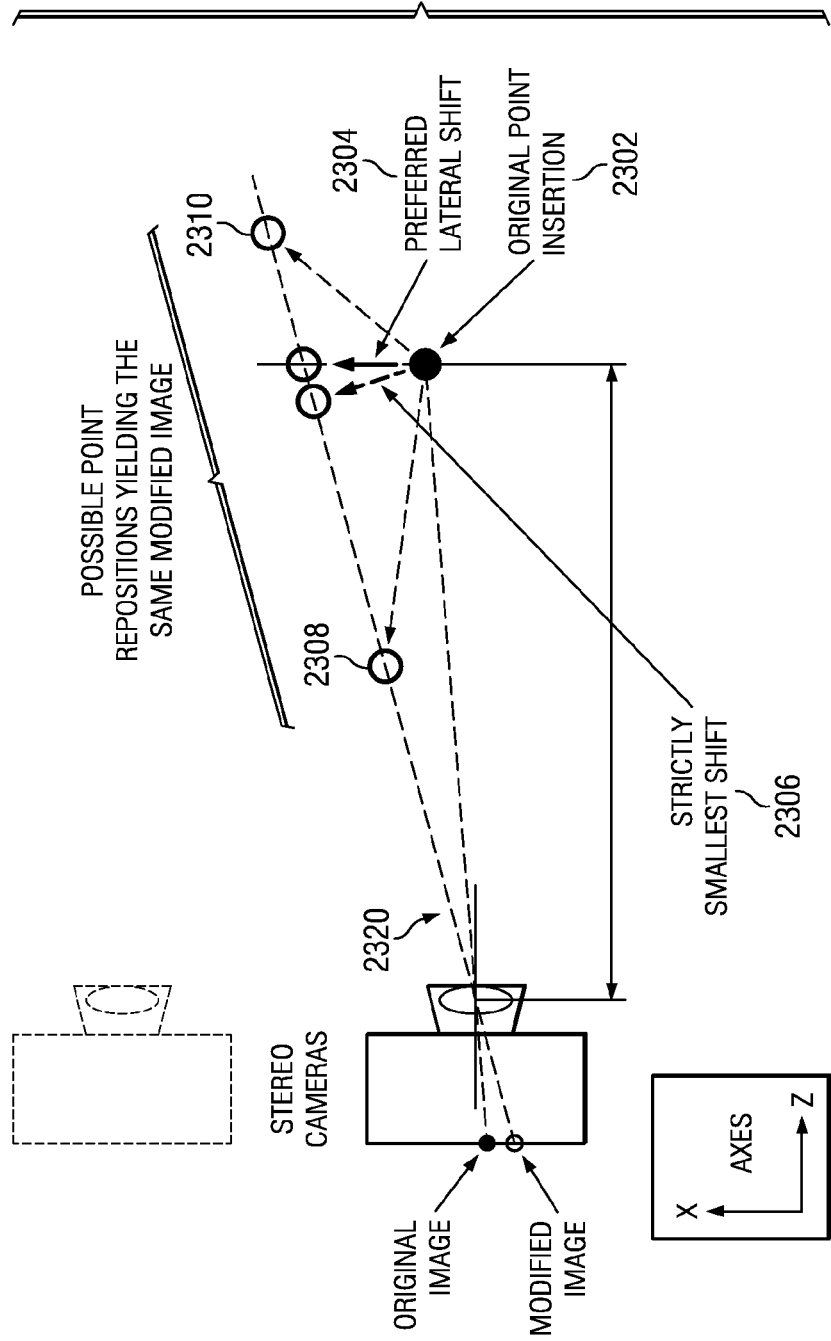
FIG. 23 is a schematic diagram illustrating repositioning options for CGI model points to provide modified disparity, in accordance with the present disclosure.

The varied repositioning options covered by Equation 47 are shown schematically in FIG. 23. The position on the camera sensor of the point's modified image may be chosen to adjust the point's disparity for corrected perceived depth. As shown, each of the repositioned points yields the same image on the camera. An original point position 2302 is shown. A possible point reposition that yields the same modified image are shown at preferred lateral shift position 2304. Another possible point reposition is the strictly smallest shift to point 2306. Alternatively, other exemplary point repositions may be toward points 2308, 2310, or any other point located on the line 2320 that provides the modified image.

Given the infinite possibilities of this correction method, minimizing the shift toward the camera (i.e., to point 2304) may be chosen as it best avoids the undesirable issues with lighting and texture mapping. For this reason, in an embodiment, no shift toward the camera with k=0 in Equation 47 is chosen. While this is not the minimum shift possible—which may be achieved by moving normal to the principal imaging ray (i.e., to point 2306)—it does offer effectively the same small shift while allowing more convenient mathematical translation of mapping functions.

Another advantage of the subtle lateral shift approach over the more extreme z-scaling approach is a significant reduction in depth reversal caused by sparse model points or vertices. Repositioning sparse vertices may cause points forming the connecting lines to acquire positions different from those should they have been manipulated individually. On occasions, the incorrect positions may lead to depth reversal where a line point can end up in front of other repositioned vertices reversing their original depth order. The very small lateral shifting substantially eliminates these problems for almost any scene barring those using very large polygons. In these cases, lines may be broken by introducing intermediate points.

In various embodiments, depth correction techniques may be embodied using one or more CG modeling packages, e.g., commercially available products Maya or 3D Studio Max, both supplied by Autodesk. These packages may allow additions in the form of plug-ins or scripts that manipulate the capture of images. In some embodiments, more sophisticated rendering algorithms such as mental Ray®, and physics engines such as Havok™ may be incorporated. The additions may offer the option of rendering a scene, or a sequence of scenes with a pair of stereo cameras. The capture parameters (camera separation and skews) could either be defined manually or automatically using Equations 11 and 48, where skew S may be defined as:

$$S := \frac{2 \cdot \tan(\theta) \cdot (D\_max \cdot Z\_max - D\_min \cdot Z\_min)}{W \cdot (Z\_max - Z\_min)}. \quad \text{(Equation 48)}$$

For automatic determination, disparity limits D_max and D_min may be used, as they are viewer and display dependent. The scene depth may also be manually input, or possibly automatically input by interrogating the depth of those model points that are visible. In an embodiment, scanning the z-buffer for the maximum and minimum values is implemented. Additionally, disparity limits may be predetermined based upon the size of the viewer's screen and/or screen type.

Figure 24:
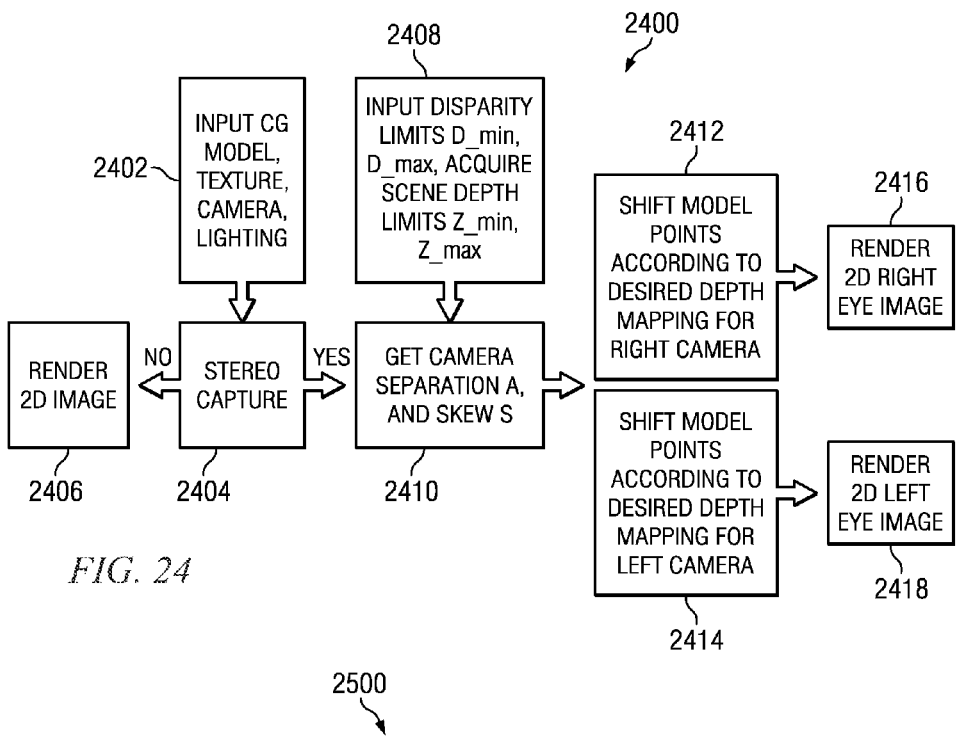
FIG. 24 is a flow chart of a method for depth mapping, in accordance with the present disclosure.

FIG. 24 is a flow diagram of an exemplary technique 2400 for image creation that uses the subtle lateral shift approach described above. Here, the CG model, texture, camera positions, and lighting parameters are input at step 2402. It is then determined whether this is a stereoscopic capture at step 2404. If it is not a stereoscopic capture, then the image is rendered as a 2D image, at step 2406. Otherwise, if step 2404 determines that it is a stereoscopic capture, then camera separation A and skew S parameters are determined at step 2410, also taking into consideration disparity limits $D_{min}$, $D_{max}$, $Z_{max}$, and $Z_{min}$, as automatically determined or manually input from step 2408. Model points are then shifted according to a desired depth mapping for the right camera, at step 2412, Similarly, model points are shifted according to a desired depth mapping for the left camera, at step 2414. The 2D right eye image is rendered at step 2416, and the 2D left eye image is rendered at step 2418.

Figure 21A:
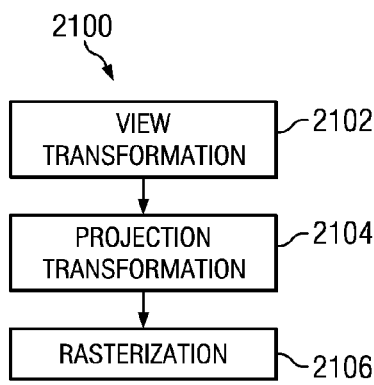
FIG. 21A is a flow diagram of an exemplary technique 2100 for image creation and FIG. 21B is a schematic diagram illustrating an exemplary module 2150 for image creation.
Figure 21B:
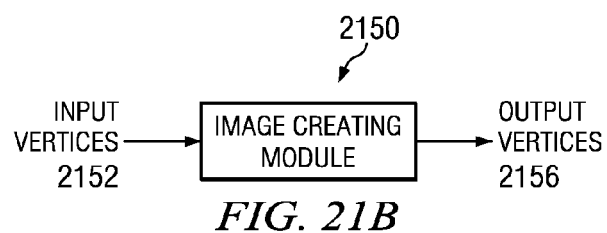

FIG. 21A is a flow diagram of an exemplary technique 2100 for image creation and FIG. 21B is a schematic diagram illustrating an exemplary module 2150 for image creation. Exemplary image creation technique 2100 may be performed in a three step process. For instance, in step 2102, the polygon vertices may be transformed into the camera's coordinate system—the so-called view transformation. In step 2104, the same vertices may be projected onto an image plane with normalized depth values. View transformation 2102 and projection transformation 2104 are discussed in greater detail below. The pixel values may be calculated using the process of rasterization in step 2106. Depth reallocation may be incorporated during either one of the first two of these three steps.

In an embodiment, the image creation technique 2100 is implemented in an image creating module 2150 operable to receive and analyze image data including input vertices 2152 and provide modified image data including output vertices 2156. The module 2150 may be any suitable logical device known in the art, and may be embodied in hardware, software, or a combination. The module 2150 may also be stored on a computer readable medium, as instructions for a machine; and may be a plug-in for a 3D software package.

View Transformation

To define a vertex position in a coordinate system whose origin is at the camera and whose orientation is defined by the capture frustum, world coordinate values may be translated and rotated. While translations can be described by 3×3 matrix manipulations transformations may utilize a 4×4 representation. A general vertex position may be given by:

$$\begin{pmatrix} X \\ Y \\ Z \\ 1 \end{pmatrix}. \quad \text{(Equation 49)}$$

The unit value of the fourth component can be regarded as a dummy parameter whose value may be chosen to be one.

Translating a general vertex position to one relative to the camera position is then a matter of performing the following matrix manipulation:

$$\begin{pmatrix} 1 & 0 & 0 & -Cx \\ 0 & 1 & 0 & -Cy \\ 0 & 0 & 1 & -Cx \\ 0 & 0 & 0 & 1 \end{pmatrix} \cdot \begin{pmatrix} X \\ Y \\ Z \\ 1 \end{pmatrix}. \quad \text{(Equation 50)}$$

Rotating the resulting vertex representation provides its position (vx,vy,vz) in desired camera view coordinates:

$$\begin{pmatrix} vx \\ vy \\ vz \\ 1 \end{pmatrix} = \begin{pmatrix} I \cdot i & I \cdot j & I \cdot k & 0 \\ J \cdot i & J \cdot j & J \cdot k & 0 \\ K \cdot i & K \cdot j & K \cdot k & 0 \\ 0 & 0 & 0 & 1 \end{pmatrix} \cdot \quad \text{(Equation 51)}$$

$$\begin{pmatrix} 1 & 0 & 0 & -Cx \\ 0 & 1 & 0 & -Cy \\ 0 & 0 & 1 & -Cz \\ 0 & 0 & 0 & 1 \end{pmatrix} \begin{pmatrix} X \\ Y \\ Z \\ 1 \end{pmatrix}$$

$$= \begin{pmatrix} I \cdot i & I \cdot j & I \cdot k & -I \cdot C \\ J \cdot i & J \cdot j & J \cdot k & -J \cdot C \\ K \cdot i & K \cdot j & K \cdot k & -K \cdot C \\ 0 & 0 & 0 & 1 \end{pmatrix} \cdot \begin{pmatrix} X \\ Y \\ Z \\ 1 \end{pmatrix}.$$

Projection Transformation

The generalized perspective transformation can be written:

$$\begin{pmatrix} xx \\ yy \\ zz \\ vz \end{pmatrix} = \begin{pmatrix} \frac{2 \cdot Zn}{Vw} & 0 & 0 & 0 \\ 0 & \frac{2 \cdot Zn}{Vh} & 0 & 0 \\ 0 & 0 & \frac{Zf}{Zf - Zn} & \frac{Zf \cdot Zn}{Zf - Zn} \\ 0 & 0 & 1 & 0 \end{pmatrix} \cdot \begin{pmatrix} vx \\ vy \\ vz \\ 1 \end{pmatrix} \quad \text{(Equation 52)}$$

where:

Zn is the distance from camera to the plane where Zbuffer value=0 (typically near clipping plane), Zf is the distance from camera to the plane where Zbuffer value=1 (typically far clipping plane), Vh is the height of the viewport positioned at Zn, and Vw is the width of the viewport positioned at Zn.

The normalized (x', y') position of the vertex in the image plane is then:

$$(x', y') = \left(\frac{xx}{vz}, \frac{yy}{vz}\right) \quad \text{(Equation 53)}$$

with its Zbuffer value given by:

$$Zbuffer = \frac{(vz - Zn) \cdot Zf}{(Zf - Zn) \cdot vz}. \quad \text{(Equation 54)}$$

Depth Budget Reallocation Using World Scaling

In an embodiment, depth budget reallocation is implemented prior to the first view transformation and is carried out one time before a left and a right eye capture. The method scales the vertex positions (x,y,z) toward the midpoint (mx, my, mz) between lenses of the camera rig and is referred to herein as world scaling.

Figure 22:
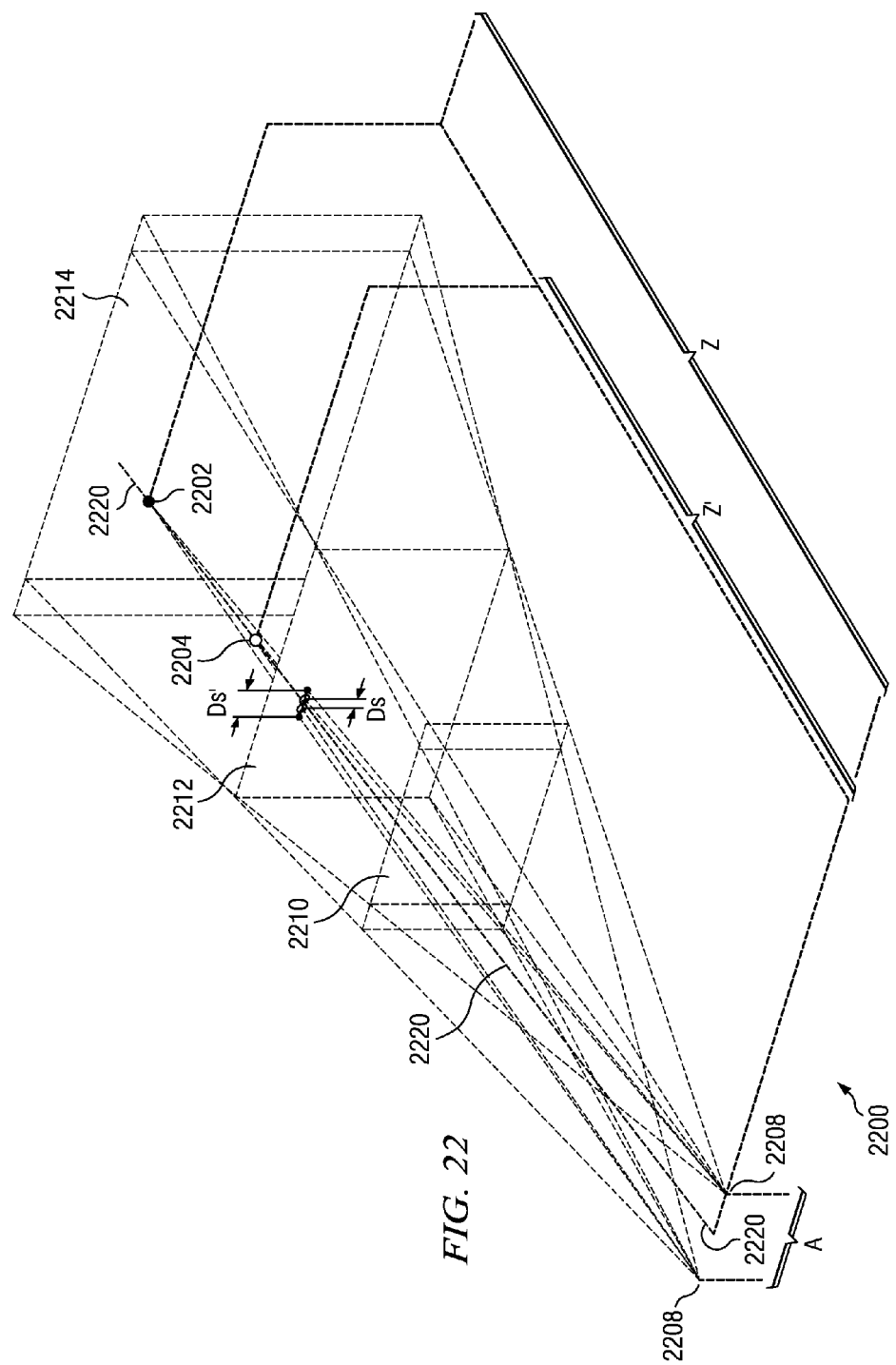
FIG. 22 is a schematic perspective diagram illustrating depth budget reallocation scaling, in accordance with the present disclosure.

FIG. 22 is a schematic perspective diagram 2200 illustrating world scaling. A frustum far plane 2214, a frustum close plane 2210, and a screen or image plane 2212 are shown in the diagram 2200. The original object 2202 is replaced by a scaled replacement object 2204. The original object 2202 is at an original depth Z and has a screen disparity of Ds. The original object 2202 may be scaled toward the camera midpoint 2206 along a line 2220. The camera midpoint 2206 is the mid-point between the camera positions 2208 and the line 2220 extends from the original object 2202 through the camera midpoint 2206. The scaled replacement object 2204 is at a new depth Z' and has a screen disparity of Ds'.

Mathematically, this can be written with the same 4D representation as a coordinate origin shift, a scaling and inverse shift, or:

$$\left[ \begin{pmatrix} I \cdot i & I \cdot j & I \cdot k & -I \cdot C \\ J \cdot i & J \cdot j & J \cdot k & -J \cdot C \\ K \cdot i & K \cdot j & K \cdot k & -K \cdot C \\ 0 & 0 & 0 & 1 \end{pmatrix}^{-1} \begin{pmatrix} 1 & 0 & 0 & 0 \\ 0 & 1 & 0 & 0 \\ 0 & 0 & 1 & 0 \\ 0 & 0 & 0 & \frac{Z}{Z'(Z)} \end{pmatrix} \cdot \right.$$

$$\left. \begin{pmatrix} I \cdot i & I \cdot j & I \cdot k & -I \cdot C \\ J \cdot i & J \cdot j & J \cdot k & -J \cdot C \\ K \cdot i & K \cdot j & K \cdot k & -K \cdot C \\ 0 & 0 & 0 & 1 \end{pmatrix} \right] \cdot \begin{pmatrix} X \\ Y \\ Z \\ 1 \end{pmatrix}.$$

(Equation 55)

The resulting vectors are scaled to make their fourth component equal to one.

Application to Computer Game and CG Environments

In various embodiments, depth-mapping within a real-time computer game or CG-created graphical environment (e.g., a flight simulator, virtual reality environment, etc.) may be employed. The basic implementation is similar to those already disclosed above, and it is compatible with a rasterization technique of image formation. Automation is preferred for interactive games making z-Buffer determination of scene depth and optimal mapping preferred. It is assumed that real-time stereoscopic rendering preferably preserves operating frame rate and transmission bandwidth. A suitable solution is provided for by RealID's output data format (e.g., as taught in commonly-owned Pat. App. Ser. No. 61/168,925, herein incorporated by reference), where half resolution images are rendered on a diagonal grid to produce side-by-side single stereoscopic frames for transmission down standard DVI cabling.

The dynamic response used by games differs from the CG 2D capture. Automated correction may be used to adjust the depth mapping on a frame by frame basis. Simple implementations using correction parameters determined from single frames may cause problems. For example, close objects entering the scene may cause rapid changes in perceived depth even prior to the viewer noticing objects entering from the side. To avoid this and related phenomena, the adjustment may incorporate either damped adjustment by possibly taking an average of scene parameters over many frames, or adjusting slowly to anticipated events. The latter could be based on the proximity of depth adjusting objects to the capture frustum.

Edge conflict may also be an issue with games which, though a problem with non real-time CG capture, may be dealt with automatically within a game scenario, especially if desirable negative disparity effects are allowed. Edge conflict is when a negative disparity object (i.e., one that appears in front of a stereoscopic display) is apertured by the vertical screen edge. The object may appear to be visually blocked by something behind it. This may cause confusion and discomfort to the viewer. One solution, as disclosed by Robert Neuman in *Bolt 3D: A Case Study*, involves floating windows where a false edge is displayed with the object which also has negative disparity avoiding the conflict. In a game, introducing floating windows dynamically may become intrusive. A better option is to substantially prevent objects from having negative disparity close to the edge by either (1) not allowing negative disparity; (2) only allowing negative disparity when there is no conflict; or (3) altering the disparity closer to the edges. The last is not favored as it may cause noticeable depth distortion in the form of fish bowl distortion. On the other hand, the first detracts from the "wow" factor that gamers desire. The second option is therefore favored, and may be incorporated into the overall depth mapping algorithm.

A further consideration for stereoscopic computer gaming is viewer head movement and tilt. Unlike movies in the cinema, a computer game invites the participant to move physically as part of the experience. Nintendo has recently capitalized on this with its highly commercially successful Wii game console. Moving viewing position causes the displayed world to rotate unnaturally about a vertical axis situated in the plane of the screen. This is a consequence of the viewing geometry and not well appreciated by most whose primary experience is in viewing 3D films at a large distance from a cinema screen. Here, the rotation is too slight to be unnoticed. To avoid rotation on the smaller gaming displays, images may be altered in accordance with the viewer's position. While head tracking can be done with direct camera imaging of the player, it is simplified in cases where the viewer wears recognizable eyewear. Many approaches can be considered, although a passive infrared illumination of retro-reflector adorned eyewear is possibly preferred (e.g., as taught in commonly-owned patent application Ser. No. 12/606,828, herein incorporated by reference). Once detected, the head position requires the imagery to be modified to avoid unnatural 3D rotation. The modification can be determined empirically with trial and error methods, although it can also be calculated accurately based on the known perceived depth. This latter is preferred as it avoids sensory conflicts and subsequent fatigue.

Head tilt can be determined using the same head tracking hardware. This is convenient, as stereoscopic imagery may not be viewed correctly when viewed with a tilted head. Images typically have horizontal disparity which is only correct for viewers whose eyes are horizontal. At an angle, the display appears to have disparity normal to the axis of the eyes, which is known to cause fatigue. Offsetting the imagery at the same angle as the viewer's head avoids this issue and leads to a more immersive experience. The point repositioning depth correction may be modified in accordance with the rotated disparity axis.

Games might also desire unnatural depth adjustment to exaggerate effects. Modification to the optimal mapping could accomplish this (together with other mapping functions Z'(Z)) through simple scaling of the lateral scaling function $\Delta x(Z)$. Mathematically, a scaling value υ could be introduced where a new lateral displacement $\Delta x'(Z) = \upsilon \cdot \Delta x(Z)$ could be implemented which alters the correction as desired.

Figure 25:
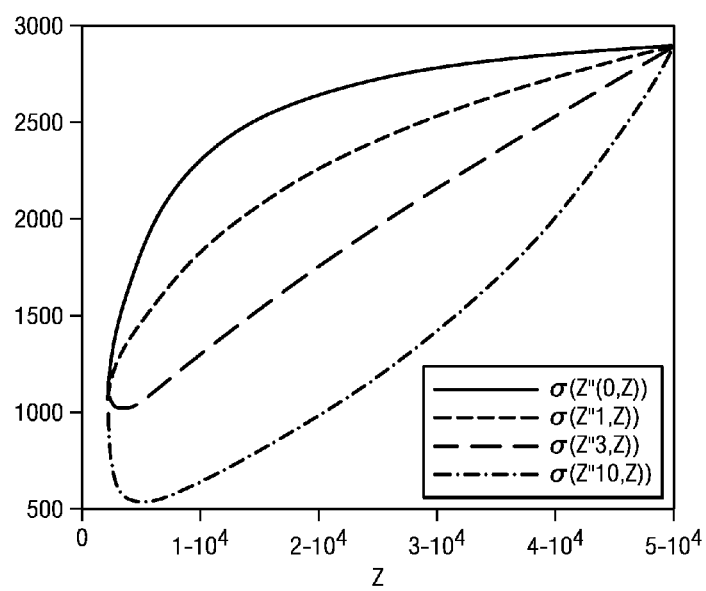
FIG. 25 is a graph illustrating the effect of scaling the lateral shift correction $\Delta x$ associated with optimal mapping, in accordance with the present disclosure.

FIG. 25 is a graph 2500 illustrating the effect of scaling the lateral shift correction $\Delta x$ associated with optimal mapping, showing the effect of υ on optimal mapping. As shown, the gradient of the curves move deeper as the value of υ increases. For the viewer, the more distant areas of the scene get stretched which could be desired. The more separated in depth a region becomes the more interest it typically has for a viewer. Authors of games could encode values for υ, dependent on the visible scene, that trigger alternative mappings.

FIG. 25 also highlights an issue with inverted perceived depth close in created with simple scaling. This may be avoided however by forcing all perceived depths closer than the minimum allowed, to be at the minimum. Enforced clipping of Δx'(Z) uses the following logic:

$$\Delta x'(\upsilon, Z) = \begin{vmatrix} \upsilon \cdot \Delta x(Z) \text{ if } A \cdot \frac{Z}{(2 \cdot \upsilon \cdot \Delta x(Z) + A)} > Z\_min \\ \left[\frac{A}{2} \cdot \left(\frac{Z}{Z\_min} - 1\right)\right] \text{ otherwise} \end{vmatrix} \quad \text{Equation 56}$$

While various embodiments in accordance with the principles disclosed herein have been described above, it should be understood that they have been presented by way of example only, and not limitation. Thus, the breadth and scope of the invention(s) should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically and by way of example, although the headings refer to a "Technical Field," the claims should not be limited by the language chosen under this heading to describe the so-called field. Further, a description of a technology in the "Background" is not to be construed as an admission that certain technology is prior art to any invention(s) in this disclosure. Neither is the "Summary" to be considered as a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings set forth herein.

What is claimed is:

1. A method for processing a Computer Generated (CG) stereoscopic scene, the method comprising:
   receiving a CG model of a stereoscopic scene having left image and right image model points; and
   determining repositioning for the left image and right image model points in the CG model from input variables comprising an input disparity parameter pair and a scene depth parameter pair;
   wherein the scene depth parameter pair comprises a depth of the furthest object in the CG stereoscopic scene and a depth of the closest object in the CG stereoscopic scene, further wherein the depths of the furthest object and the closest object in the CG stereoscopic scene are determined from the CG stereoscopic scene; and
   wherein the depths of the closest object and the furthest object in the CG stereoscopic scene remain substantially unchanged after repositioning;
   wherein the input disparity parameter pair comprises $D_{max}$ and $D_{min}$, wherein $D_{max}$ is the maximum disparity limit for parallel eyes, and $D_{min}$ is the maximum disparity limit for crossed eyes,
   wherein the scene depth parameter pair comprises $Z_{max}$ and $Z_{min}$, wherein $Z_{max}$ is the furthest object in the CG stereoscopic scene, and $Z_{min}$ is the closest object in the CG stereoscopic scene;
   wherein determining repositioning for left image and right image model points comprises using a point reposition depth mapping function comprising:

$$Z'(Z) = \frac{(\alpha \cdot \ln(Z+\beta) + B) \cdot \beta}{1 - \alpha \cdot \ln(Z+\beta) - B},$$

wherein $\beta = \frac{(D_{max} - D_{min}) \cdot (Z_{min} \cdot Z_{max})}{[E \cdot (Z_{max} - Z_{min}) - D_{max} \cdot Z_{max} + D_{min} \cdot Z_{min}]},$ wherein $\alpha = \frac{\beta \cdot (Z_{min} - Z_{max})}{\ln\left[\frac{(Z_{min} + \beta)}{(Z_{max} + \beta)}\right] \cdot [(Z_{min} + \beta) \cdot (Z_{max} + \beta)]},$ wherein $B = \frac{Z_{min}}{Z_{min} + \beta} - \alpha \cdot \ln(Z_{min} + \beta),$ wherein Z is an initial model point location from a left-eye or a right-eye observation point, wherein $$Z = \begin{pmatrix} x \\ y \\ z \end{pmatrix},$$

and
   wherein E is eye separation.

2. The method of claim 1, further comprising determining the input disparity parameter pair from the CG model.

3. The method of claim 1, further comprising determining the input disparity parameter pair from a predetermined setting.

4. The method of claim 1, further comprising determining the scene depth parameter pair from the CG model.

5. The method of claim 1, further comprising determining the scene depth parameter pair from a predetermined setting.

6. The method of claim 1, wherein determining repositioning for left image and right image model points comprises using a point reposition depth mapping function comprising:

$$Z'(Z) = \frac{\beta}{(K \cdot Z^{-\gamma} - 1)},$$

wherein $\beta = \frac{(D_{max} - D_{min}) \cdot (Z_{min} \cdot Z_{max})}{[E \cdot (Z_{max} - Z_{min}) - D_{max} \cdot Z_{max} + D_{min} \cdot Z_{min}]},$ wherein $\gamma = \frac{\ln\left[\frac{(E - D_{max})}{(E - D_{min})}\right]}{\ln\left(\frac{Z_{min}}{Z_{max}}\right)},$ wherein $K = \frac{(Z_{min} + \beta)}{Z_{min}^{1-\gamma}},$ wherein Z is an initial model point location from a left-eye or a right-eye observation point, wherein $$Z = \begin{pmatrix} x \\ y \\ z \end{pmatrix},$$

and wherein E is eye separation.

7. The method of claim 1, wherein the input disparity parameter pair is based on a minimum separation and a maximum separation.

8. The method of claim 1, wherein determining repositioning comprises referencing a predetermined point reposition depth mapping from a look up table based on the input variables.

9. The method of claim 1, wherein the input variables further comprise a head tilt variable, wherein the stereoscopic CG scene is modified in accordance with the head tilt variable.

10. The method of claim 1, further comprising rendering the CG modified stereoscopic scene.

11. An apparatus for processing a computer generated (CG) stereoscopic scene comprising at least one processor implementing:

receiving a CG model of a stereoscopic scene having left image and right image model points; and repositioning the left image and right image model points in the CG model from input variables comprising an input disparity parameter pair and a scene depth parameter pair, wherein the scene depth parameter pair comprises the furthest object in the CG stereoscopic scene and the closest object in the CG stereoscopic scene, and wherein the left and right image model points of the furthest object and the closest object in the CG stereoscopic scene remains substantially unchanged after repositioning further wherein the depths of the furthest object and the closest object in the CG stereoscopic scene are determined from the CG stereoscopic scene;

wherein the input disparity parameter pair comprises $D_{max}$ and $D_{min}$, wherein $D_{max}$ is the maximum disparity limit for parallel eyes, and $D_{min}$ is the maximum disparity limit for crossed eyes, wherein the scene depth parameter pair comprises $Z_{max}$ and $Z_{min}$, wherein $Z_{max}$ is the furthest object in the CG stereoscopic scene, and $Z_{min}$ is the closest object in the CG stereoscopic scene, wherein the processing subsystem utilizes a point reposition depth mapping function comprising:

$$Z'(Z) = \frac{(\alpha \cdot \ln(Z + \beta) + B) \cdot \beta}{1 - \alpha \cdot \ln(Z + \beta) - B},$$

wherein $\beta = \frac{(D_{max} - D_{min}) \cdot (Z_{min} \cdot Z_{max})}{[E \cdot (Z_{max} - Z_{min}) - D_{max} \cdot Z_{max} + D_{min} \cdot Z_{min}]}$, wherein $\alpha = \frac{\beta \cdot (Z_{min} - Z_{max})}{\ln\left[\frac{(Z_{min} + \beta)}{(Z_{max} + \beta)}\right] \cdot [(Z_{min} + \beta) \cdot (Z_{max} + \beta)]}$, wherein $B = \frac{Z_{min}}{Z_{min} + \beta} - \alpha \cdot \ln(Z_{min} + \beta)$, wherein Z is an initial model point location from a left-eye or a right-eye observation point, where $$Z = \begin{pmatrix} x \\ y \\ z \end{pmatrix},$$

and wherein E is eye separation.

12. The apparatus of claim 11 further comprises a buffer.

13. The apparatus of claim 11, wherein the processor utilizes a point reposition depth mapping function comprising:

$$Z'(Z) = \frac{\beta}{(K \cdot Z^{-\gamma} - 1)},$$

wherein $\beta = \frac{(D_{max} - D_{min}) \cdot (Z_{min} \cdot Z_{max})}{[E \cdot (Z_{max} - Z_{min}) - D_{max} \cdot Z_{max} + D_{min} \cdot Z_{min}]}$, wherein $\gamma = \frac{\ln\left[\frac{(E - D_{max})}{(E - D_{min})}\right]}{\ln\left(\frac{Z_{min}}{Z_{max}}\right)}$, wherein $K = \frac{(Z_{min} + \beta)}{Z_{min}^{1-\gamma}}$, wherein Z is an initial model point location from a left-eye or a right-eye observation point, wherein $$Z = \begin{pmatrix} x \\ y \\ z \end{pmatrix},$$

and wherein E is eye separation.

14. The apparatus of claim 11, wherein the input variables further comprise a head tilt variable, wherein the stereoscopic CG scene is modified in accordance with the head tilt variable.

* * * * *